US009515335B2

(12) United States Patent
Otsuka et al.

(10) Patent No.: US 9,515,335 B2
(45) Date of Patent: Dec. 6, 2016

(54) SOLID OXIDE FUEL CELL SYSTEM

(75) Inventors: Toshiharu Otsuka, Nakama (JP);
Katsuhisa Tsuchiya, Chigasaki (JP);
Tsukasa Shigezumi, Nishinomiya (JP);
Toshiharu Ooe, Chigasaki (JP);
Kiyotaka Nakano, Narashino (JP);
Takuya Matsuo, Yokohama (JP)

(73) Assignee: TOTO LTD., Fukuoka (JP)

( * ) Notice: Subject to any disclaimer, the term of this patent is extended or adjusted under 35 U.S.C. 154(b) by 268 days.

(21) Appl. No.: 14/347,990

(22) PCT Filed: Sep. 29, 2011

(86) PCT No.: PCT/JP2011/072401
§ 371 (c)(1),
(2), (4) Date: Mar. 27, 2014

(87) PCT Pub. No.: WO2013/046396
PCT Pub. Date: Apr. 4, 2013

(65) Prior Publication Data
US 2014/0234738 A1 Aug. 21, 2014

(51) Int. Cl.
*H01M 8/04* (2016.01)
*H01M 8/24* (2016.01)

(52) U.S. Cl.
CPC ....... *H01M 8/04992* (2013.01); *H01M 8/0491* (2013.01); *H01M 8/04626* (2013.01); *H01M 8/04753* (2013.01); *H01M 8/243* (2013.01); *Y02E 60/50* (2013.01)

(58) Field of Classification Search
None
See application file for complete search history.

(56) References Cited

U.S. PATENT DOCUMENTS

2010/0203409 A1\* 8/2010 Manabe ............ H01M 8/04268
429/431

FOREIGN PATENT DOCUMENTS

| JP | 07-307163 A | 11/1995 |
| JP | 9-270265 A | 10/1997 |
| JP | 2000-348748 A | 12/2000 |
| JP | 2004-063180 A | 2/2004 |

(Continued)

OTHER PUBLICATIONS

International Search Report for International Application No. PCT/JP2011/072401, dated Dec. 27, 2011, 2 pages.

(Continued)

*Primary Examiner* — Scott J Chmielecki
(74) *Attorney, Agent, or Firm* — Brinks Gilson & Lione

(57) ABSTRACT

The invention is to provide a solid oxide fuel cell system including: a fuel cell module, a fuel flow regulator unit, a first power demand detection device, a control section for controlling a fuel supply amount and setting the current value extractable from the fuel cell module, an inverter for extracting current in a range not exceeding the extractable current value, and a power state detecting sensor for detecting actual extracted current value; whereby if actual extracted current value declines, then under circumstances where power demand begins to rise in a state of extra margin in the fuel supply amount after the controller suddenly decreases the extractable current value and suddenly reduces the electrical collector, the controller increases the extractable current value at a high current rise rate of change.

5 Claims, 14 Drawing Sheets

(56) References Cited

FOREIGN PATENT DOCUMENTS

| | | |
|---|---|---|
| JP | 2004-063368 A | 2/2004 |
| JP | 2007-012403 A | 1/2007 |
| JP | 2007-188827 A | 7/2007 |
| JP | 2007-294443 A | 11/2007 |
| JP | 2008-84715 A | 4/2008 |
| JP | 2010-62032 A | 3/2010 |
| JP | 2011-76941 A | 4/2011 |

OTHER PUBLICATIONS

Written Opinion of the International Searching Authority for International Application No. PCT/JP2011/072401, dated Dec. 27, 2011, 8 pages.
International Preliminary Report on Patentability for International Application No. PCT/JP2011/072401, dated Apr. 1, 2014, 9 pages.
Extended European Search Report in corresponding European Application No. 11873354.2, dated May 13, 2015, 9 pages.

* cited by examiner

FIG.9

| No. | TRANSITION CONDITION ||||||| STATE PROCESS ||
| --- | --- | --- | --- | --- | --- | --- | --- | --- | --- |
| | GENERATING CHAMBER TEMP. Tfc | GENERATING VOLTAGE Vdc | GRID POWER Wl | INTERCONNECT POWER Winv | EXTRACTABLE CURRENT VALUE Iinv | FUEL SUPPLY CURRENT VALUE If | STATE PROCESS | EXTRACTABLE CURRENT VALUE |
| 1 | — | — | — | — | (Iinv−ACTUAL EXTRACTED CURRENT)≧[400mA] AND Iinv>[1A] | — | DECREASE Iinv | Iinv = Iinv−5mA, BUT 1A IF VALUE FALLS BELOW 1A |
| 2 | GENERATING TEMP. >[850°C] | — | — | — | Iinv>[1A] | — | DECREASE Iinv | Iinv = Iinv−5mA, BUT 1A IF VALUE FALLS BELOW 1A |
| 3 | GENERATING TEMP. <[550°C] | — | — | — | Iinv>[1A] | — | DECREASE Iinv | Iinv = Iinv−5mA, BUT 1A IF VALUE FALLS BELOW 1A |
| 4 | — | GENERATING VOLTAGE <[95V] | — | — | Iinv>[1A] | — | DECREASE Iinv | Iinv = Iinv−10mA, BUT 1A IF VALUE FALLS BELOW 1A |
| 5 | — | — | — | INTERCONNECT POWER >[710W] | Iinv>[1A] | — | DECREASE Iinv | Iinv = Iinv−5mA, BUT 1A IF VALUE FALLS BELOW 1A |
| 6 | — | — | GRID POWER <[50W] | — | (Iinv−ACTUAL EXTRACTED CURRENT)>[1000mA] | — | IMMEDIATELY DROP Iinv | Iinv = ACTUAL EXTRACTED CURRENT |
| 7 | — | — | GRID POWER >[40W] | INTERCONNECT POWER ≦[690W] | (Iinv−ACTUAL EXTRACTED CURRENT)≦[300mA] | FUEL SUPPLY CURRENT VALUE − ACTUAL EXTRACTED CURRENT≧[1000mA] | INCREASE Iinv (FAST RISE) | Iinv = Iinv+100mA |
| 8 | GENERATING TEMP. ≧[600°C] | GENERATING VOLTAGE ≧[100V] | — | — | — | — | INCREASE Iinv (NORMAL RISE) | Iinv = Iinv+10mA |
| 9 | OTHER THAN ABOVE ||||||| Iinv NO CHANGE | Iinv = Iinv |

※CONTROL CYCLE : 500msec

SOLID OXIDE FUEL CELL SYSTEM

This application is a 371 application of PCT/JP2011/072401 having an international filing date of Sep. 29, 2011, the entire content of which is incorporated herein by reference.

TECHNICAL FIELD

The present invention pertains to a solid oxide fuel cell system, and more particularly to a solid oxide fuel cell system for generating variable electrical power in response to power demand.

BACKGROUND ART

In recent years, various solid oxide fuel devices comprising fuel cells capable of obtaining electrical power by generating electricity using fuel (hydrogen gas) and air, as well as auxiliary equipment for running such fuel cells, have been proposed as next-generation energy sources.

Japanese Unexamined Patent Application 11.7-307163 (Patent Document 1) sets forth a fuel cell device. In this fuel cell device, the electrical power generated is varied in response to load.

Here, referring to FIG. 15, we explain a power supply system utilizing a fuel cell. FIG. 15 shows an example of a conventional system for supplying electrical power to a residence using a fuel cell. In the system, electrical power consumed by a residence 200 is supplied by a fuel cell 202 and a grid power 204. Normally, the maximum power consumed by residences is larger than the maximum rated power generatable by the fuel cell 202. Therefore, even in the residence 200 utilizing the fuel cell 202, insufficiency is made up for by the grid power 204, and electrical power is supplied to the residence from the fuel cell 202 and the grid power 204. Furthermore, even in situations where the generating capacity of fuel cell 202 is below the maximum rated power for a residence, a portion of the electrical power consumed by the residence 200 is normally supplied from the grid power 204 in order to prevent a reverse current flow of the generated power to the current power 204.

The grid power 204 is power-fed from a transmission line to an electrical distribution panel inside the residence, and is purchased power. In other words, the total of the electrical power generated by the fuel cell 202 and the grid power 204 corresponds to the power consumed by the residence 200. The fuel cell 202 obtains a monitor signal from a power demand detector 206 of the electrical power purchased by the residence 200, and based on this, it varies the power generated by the fuel cell 202. That is, the fuel cell 202 determines a base current Ii, which the current that the fuel cell 202 should produce, based on the monitor signal obtained from the power demand detector 206, and controls the amount of fuel, etc. supplied to the fuel cell module 208 to enable production of this base current Ii. Also, the base current Ii is set at or below a value corresponding to the maximum rated power of fuel cell 202, regardless of the power consumed by the residence 200.

The fuel cell module 208 built into the fuel cell 202 generally has an extremely slow response, making it difficult to change its generated power to follow changes of power consumed by the residence 200. Therefore, a base current Ii signal which instructs to a fuel cell module 208 an amount of electrical power generated by fuel cell module 208 is determined by applying a filter 210 which performs integration or the like on the monitor signal, so that it changes extremely gradually compared to the change in power consumption.

The fuel cell 202 supplies the fuel cell module 208 with an amount of fuel proportional to the base current Ii so that the fuel cell module 208 has the capacity to produce the base current Ii. At the same time, an inverter 212 extracts a DC current Ic from the fuel cell module 208 and converts this to AC and supplies it to the residence 200. The actual extracted current Ic, which the inverter 212 extracts from the fuel cell module 208, is at all times set at or below the value of the base current Ii, and does not exceed the generating capacity of the fuel cell module 208. If a current equal to or greater than the generating capacity corresponding to the fuel supply amount, etc. determined based on the base current Ii is extracted from the fuel cell module 208, there is a risk that fuel depletion in fuel cells within the fuel cell module 208 will occur, causing dramatically shortening the life span of the fuel cells and damaging the fuel cells.

At the same time, because of sharp fluctuations in the power consumed by the residence 200, when consumed power suddenly drops, the residence 200 power consumption drops further than the power corresponding to the base current Ii, which is slowly varied.

In the fuel cell apparatus set forth in Japanese Unexamined Patent Application H07-307163, when the current value is increased to adapt to this type of delay in the fuel cell module 208, the set current value is updated through a delay setting instrument, and problems such as fuel depletion are prevented by delaying the increase in the set current value. Also, in this fuel cell apparatus, when updating the set current value, changes are always made in increments of subtracted current values or added current values. Therefore, the rate of change at which the said current value is changed is always fixed.

Japanese Unexamined Patent Application H7-307163

SUMMARY OF THE INVENTION

Problems the Invention Seeks to Resolve

In the solid oxide fuel cell system set forth in Japanese Published Unexamined Patent Application H7-307163, current extracted from the fuel cell is increased after a fixed time delay following an increase in fuel gas. Therefore, problems such as fuel depletion can be prevented, but the supplied fuel is wasted. That is, there are repeated sudden increases and decreases in power demand relative to the extremely slow-response fuel cell module, making it difficult to sufficiently increase generating efficiency with a constant fixed-delay control.

Therefore, the present invention has the object of providing a solid oxide fuel cell system capable of increasing the generating efficiency while reliably avoiding damage to the fuel cell module by fuel depletion or the like, and achieving the stable fuel cell module operation.

Means for Resolving Problems

To solve the above-described problems, the present invention is a solid oxide fuel cell system for generating variable power in response to power demand, comprising: a fuel cell module that generates electricity using supplied fuel; a fuel supply device that supplies fuel to the fuel cell module; a power demand detection device that detects power demand; a controller that controls the amount of fuel supplied by the fuel supply device based on the power demand detected by the power demand detection device, and that sets an extractable current value, which is the maximum current value extractable from the fuel cell module in accordance with the condition of the fuel cell module; an inverter that converts current from the fuel cell module to alternating current within a range not exceeding the extractable current value; and an extracted current detection device that detects an actual extracted current value actually extracted from the fuel cell module at the inverter; wherein the controller controls the fuel supply device so that when increasing the extractable current value, the extractable current value is increased at a predetermined first current increase rate of change, whereas when the actual extracted current value detected by the extracted current detection device decreases, the extractable current value is suddenly decreased, and the fuel supply amount is reduced at more of a delay than the reduction in extractable current value in order to follow this reduction in extractable current value, whereas when power demand begins to increase in a state in which there is extra margin in the fuel supply amount after suddenly reducing the extractable current value, the extractable current value is increased at a second current increase rate of change, which is larger than the first current increase rate of change.

In the invention thus constituted, the controller controls the amount of fuel supplied by the fuel supply device to provide fuel to the fuel cell module based on power demand detected by the power demand detection device. Furthermore, the controller sets the extractable current value, which is the maximum current value extractable from the fuel cell module according to the state of the fuel cell module. The inverter extracts power from the fuel cell module in a range within which current responsive to power demand does not exceed the extractable current value. The controller increases the extractable current value at a predetermined first current increase rate of change when raising the extractable current value, and suddenly decreases the extractable current value when the actual current value detected by the extracted current detection device decreases. Furthermore, the controller controls the fuel supply device so that the fuel supply amount is reduced more than the drop in the extractable current value, so as to follow the drop of the extractable current value. Also, when power demand begins to rise in the presence of an extra margin in the fuel supply amount after the extractable current value is suddenly decreased, the controller increases the extractable current value at the second current increase rate of change which is larger than the first current increase rate of change.

In general, the inverter is controlled with high responsiveness so that it can extract current from the fuel cell module needed to respond to suddenly changing power demands. On the other hand, if the fuel supply amount supplied to the fuel cell module is suddenly changed, electrical generation by the fuel cell module can become unstable, preventing achievement of highly responsive control. In addition, no fuel depletion is caused even if the extractable current value and the fuel supply amount are suddenly decreased in response to a sudden drop of power demand. But the fuel cell module experiences a sudden temperature drop, and sufficient generation cannot be achieved until the temperature recovers. According to the invention, the controller controls the fuel supply device so that the fuel supply amount is reduced later than the reduction of the extractable current value, even when the extractable current value is suddenly reduced. So sudden temperature drops and the like in the fuel cell module can be avoided. Since the fuel supply amount is reduced after a delay following a sudden reduction in the extractable current value, a state arises in which there is an extra margin in the fuel supply amount relative to the extractable current value. In such cases, the controller increases the extractable current value at the second current increase rate of change which is larger than the first current increase rate of change. Therefore, the following characteristics relative to recovery of power demand can be improved while suppressing fuel wastage, and the frequency of reliance on commercial power can be reduced and energy can be saved. If there is a large difference between the extractable current value and the actual extracted current value when an extra fuel margin is created to speed up inverter power extraction within that range, and then if power demand suddenly recovers, the inverter tries to follow that recovery and suddenly extract current. But if that is allowed, current extraction exceeding the extractable current value occurs due to control overshoot, etc., resulting in a new problem of damage to the cells. However, in this invention, the extractable current value is increased at a managed rate after first reducing the extractable current value. So the inverter current extraction can be balanced at a high level with the following characteristics in relation to power demand and load on the cells.

In the invention, when the actual extracted current value drops, the controller suddenly reduces the extractable current value so as to follow a reduction in the actual extracted current value, and then the controller preferably reduces the fuel supply amount, if a difference between the current corresponding to the fuel supply amount and the extractable current value is equal to or greater than a predetermined amount during a predetermined fuel reduction waiting time, or if the difference between the current corresponding to the fuel supply amount and the extractable current value expands.

The following characteristics can be increased during the rise that accompanies a recovery in power demand by reducing the delay in the fuel supply amount following a reduction of the extractable current value. However, if there is too great a deviation following the reduction of the extractable current value between the fuel supply amount and the extractable current value, or if the state of no reduction of the fuel supply amount persists, this can indeed be described as a waste of fuel. In the invention thus constituted, if there is a difference greater than a predetermined amount between the current corresponding to the fuel supply amount and the extractable current value during a standby period in which fuel reductions are suppressed following a drop in the extractable current value, or if the deviation expands, the fuel supply amount is reduced. Then, in a state with too much excess fuel relative to a power demand recovery target, or in which a judgment is made that the possibility of a power demand recovery is low, a state in which the supply of fuel is deemed excessive will be promptly avoided, thereby avoiding wasteful fuel consumption and conserving energy, while on the other hand, permitting quick load following upon recovery of demand, reducing the frequency of reliance on commercial power and indeed improving energy conservation performance.

In the invention, if the difference between the actual extracted current value and the extractable current value exceeds a predetermined amount, the controller controls the fuel supply device to reduce the extractable current value, then reduce the fuel supply amount at a delay, whereas if the difference between the actual extracted current value and the extractable current value is equal to or less than the predetermined amount, the controller does not reduce the extractable current value.

In the invention thus constituted, if the difference between the actual extracted current value and the extractable current value is equal to or less than a predetermined amount, the extractable current value is not reduced. This provides an excellent practical benefit because, under circumstances in which the difference between actual extracted current value and extractable current value is small, there is of course no reduction in the extractable current value, and the deviation is small even if the inverter follows a recovery in power demand. So there is no problem with control overshoot or the like, and effects on the cells can be avoided, allowing the following speed with respect to power demand to be greatly increased.

In the invention, when reducing the extractable current value, the controller preferably reduces the extractable current value down to the actual extracted current value.

In the invention thus constituted, the fuel supply amount reduction is delayed. Then, the extractable current value is reduced to the minimum necessary actual extracted current value. By reducing the extractable current value down to the actual extracted current value, the inverter becomes unable to freely set the amount of increase per unit time in the actual extracted current value. Therefore, the power demand following by the actual extracted current value can be completely controlled by controlling the extractable current value. This enables complete avoidance of the damage to the cells resulting from the control overshoots which is prone to occur when the deviation between the extractable current value and the actual extracted current value is large.

In the invention, when the actual extracted current value has dropped, the controller suddenly reduces the extractable current value to follow the drop in the actual extracted current value. If the power demand starts to rise during the fuel supply amount is subsequently maintained at a fixed level, the controller increases the extractable current value at the second current increase rate of change which is larger than the first current increase rate of change.

In the invention thus constituted, if the fuel supply amount is maintained at a fixed level after a sudden reduction in the extractable current value in order to follow a reduction of the actual extracted current value, the extractable current value is increased at a large current increase rate of change immediately following the timing at which power demand begins to rise. Therefore, the extractable current value can be rapidly increased with an assured margin in the fuel supply amount, and the following characteristics relative to changes in power demand can be improved while reliably and stably operating the fuel cell module.

Effect of the Invention

The invention thus constituted provides a highly practical solid oxide fuel cell system with which energy conservation performance and improved load following relative to power demand can both be achieved at a high level while reducing load on the fuel cell module.

BRIEF DESCRIPTION OF THE DRAWINGS

FIG. 9: A control table of the startup processing procedure in a fuel cell system according to an embodiment of the present invention.

DETAILED DESCRIPTION OF THE PREFERRED EMBODIMENTS

Next, referring to the attached drawings, we discuss a solid oxide fuel cell system (SOFC) according to an embodiment of the present invention.

Figure 1:
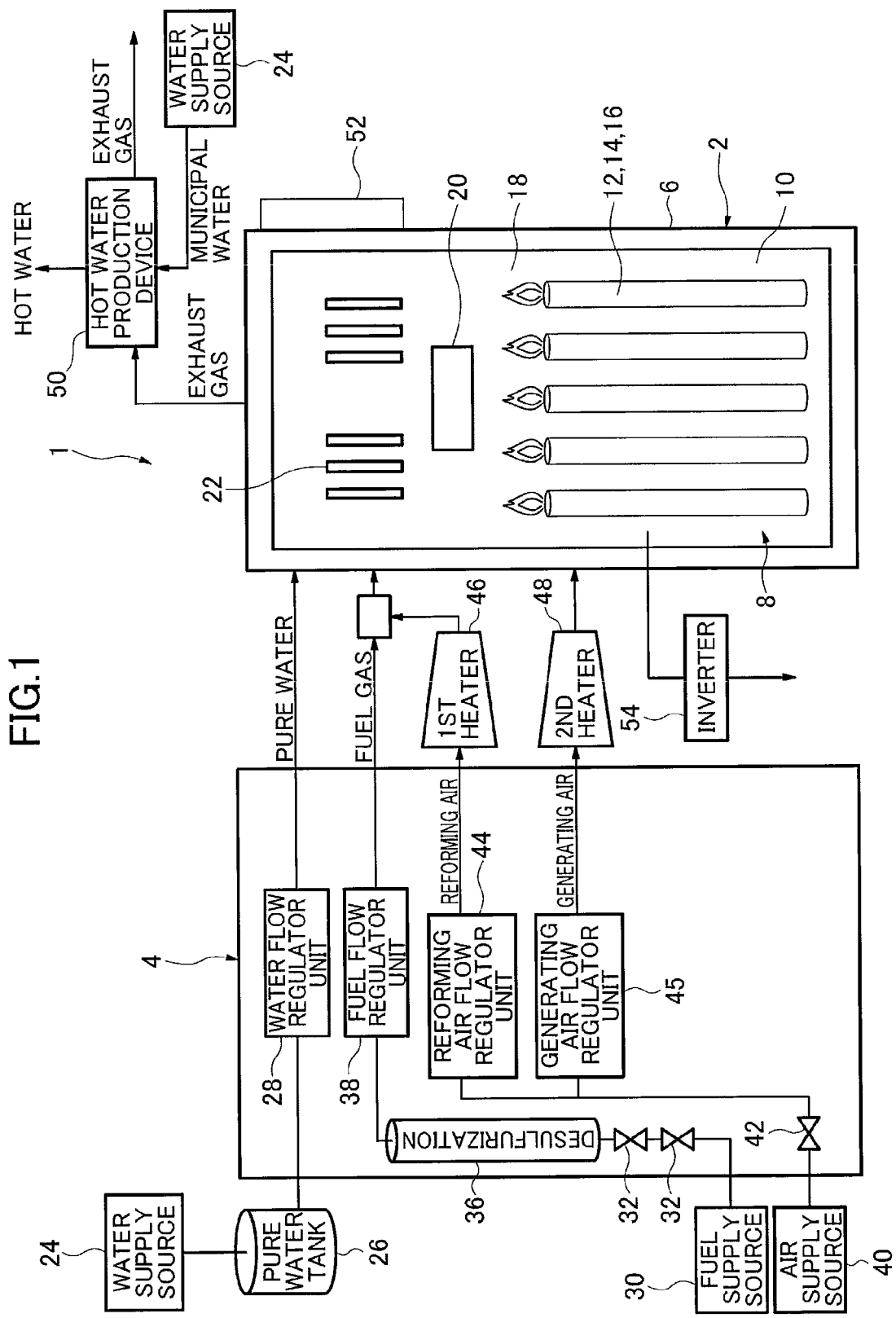
FIG. 1: An overview diagram showing a solid oxide fuel cell system according to an embodiment of the present invention.

FIG. 1 is an overview schematic showing a solid oxide fuel cell system (SOFC) according to an embodiment of the present invention. As shown in FIG. 1, solid oxide fuel cell system (SOFC) 1 according to an embodiment of the present invention comprises a fuel cell module 2 and an auxiliary unit 4.

The fuel cell module 2 comprises a housing 6; inside this housing 6, a sealed space 8 is formed, mediated by thermal insulation (not shown; thermal insulation is not an essential structure, and be can be omitted). Note that it is acceptable not to provide thermal insulation. A fuel cell assembly 12, which performs an electricity generating reaction using fuel gas and oxidant (air), is disposed on a generating chamber 10, under the sealed space 8. The fuel cell assembly 12 comprises ten fuel cell stacks 14 (see FIG. 5); the fuel cell stacks 14 comprise 16 individual fuel cell units 16 (see FIG. 4). Thus, the fuel cell assembly 12 has 160 individual fuel cell units 16, and all of these individual fuel cell units 16 are connected in series.

A combustion chamber 18 is formed above the aforementioned generating chamber 10 in the sealed space 8 of the fuel cell module 2. Excess fuel gas and excess oxidizer (air) not used in the electricity generating reaction are burned in the combustion chamber 18, producing exhaust gas.

A reformer 20 for reforming fuel gas is disposed above the combustion chamber 18. The reformer 20 is heated to a temperature at which the reforming reaction can occur by the combustion heat of the excess gas. Furthermore, an air heat exchanger 22 for receiving heat from the reformer 20 and heating air to suppress temperature drops in the reformer 20 is disposed above the reformer 20.

Next, an auxiliary unit 4 comprises a pure water tank 26, which stores water from a water supply source 24 and uses a filter to produce pure water, and a water flow volume regulator unit 28 (a motor-driven "water pump" or the like), which regulates the flow volume of water supplied from the water tank. The auxiliary unit 4 comprises a gas shutoff valve 32 for shutting off fuel gas such as municipal gas supplied from a fuel supply source 30, a desulfurizer 32 for removing sulfur from fuel gas, and a fuel flow regulator unit 38 (a motor-driven "water pump" or the like) for regulating the flow volume of fuel gas. Furthermore, the auxiliary unit 4 comprises: an electromagnetic valve 42 for shutting off air, which is oxidant gas supplied from the air supply source 40, a reform air flow regulator unit 44 and a generating air flow regulator unit 45 (a motor-driven "water pump" or the like), which regulate the flow volume air, a first heater 46 for heating reforming air supplied to the reformer 20, and a second heater 48 for heating air supplied to the electrical generating chamber. The first heater 46 and the second heater 48 are provided in order to efficiently raise the temperature at startup, but may also be omitted.

Next, a hot water production device 50, supplied with exhaust gas, is connected to the fuel cell module 2. Tap water is supplied from the water supply source 24 to the hot water production device 50. The tap water becomes hot water using the heat of the exhaust gas, and is supplied to an external hot water holding tank, not shown.

A control box 52 for controlling the amount of fuel gas supplied, etc. is connected to the fuel cell module 2.

Furthermore, an inverter 54 serving as an electrical power extraction unit (power conversion unit) for supplying electrical power generated by the fuel cell module to the outside is connected to the fuel cell module 2.

Figure 2:
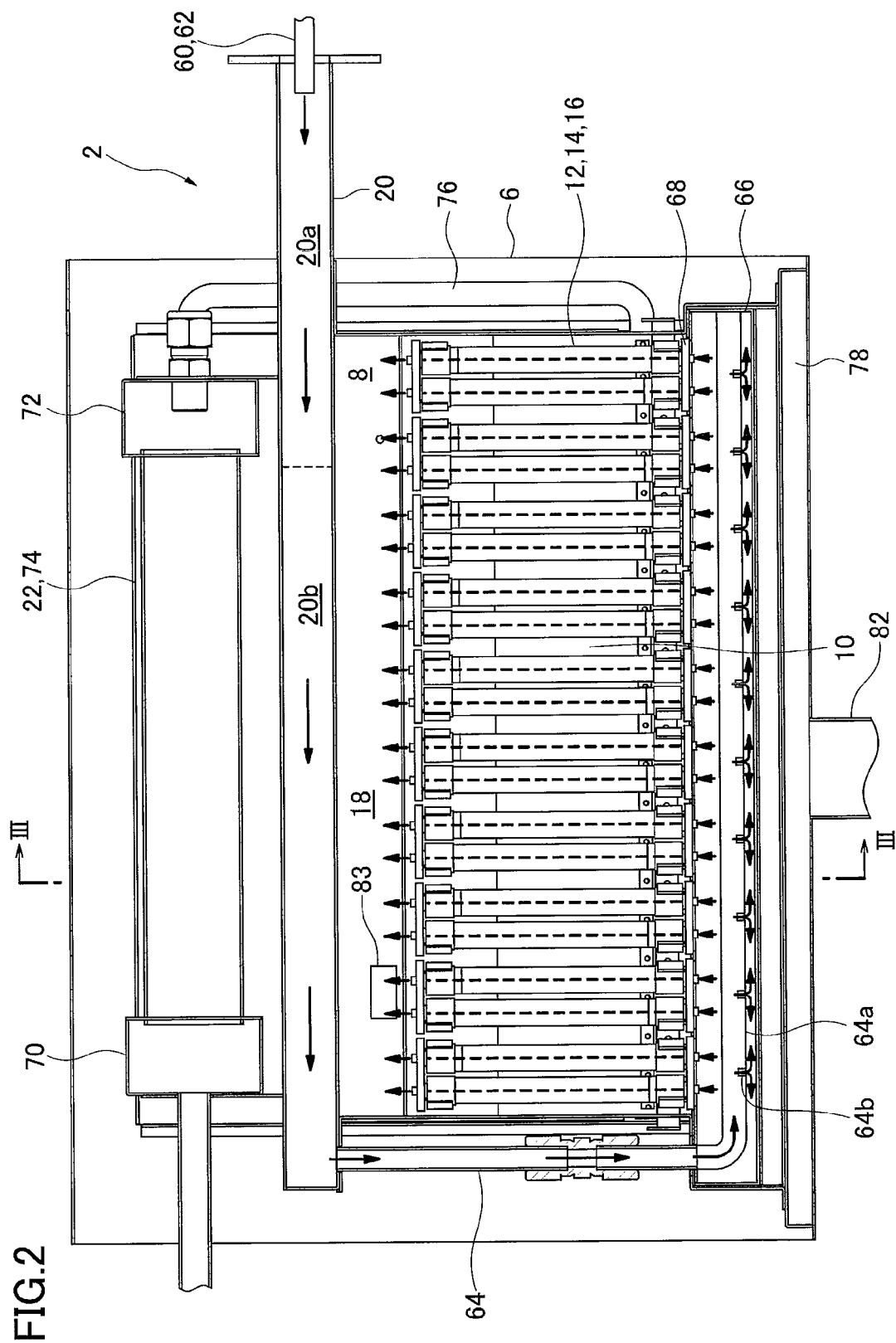
FIG. 2: A front elevation cross section showing the fuel cell module in a fuel cell system according to an embodiment of the present invention.
Figure 3:
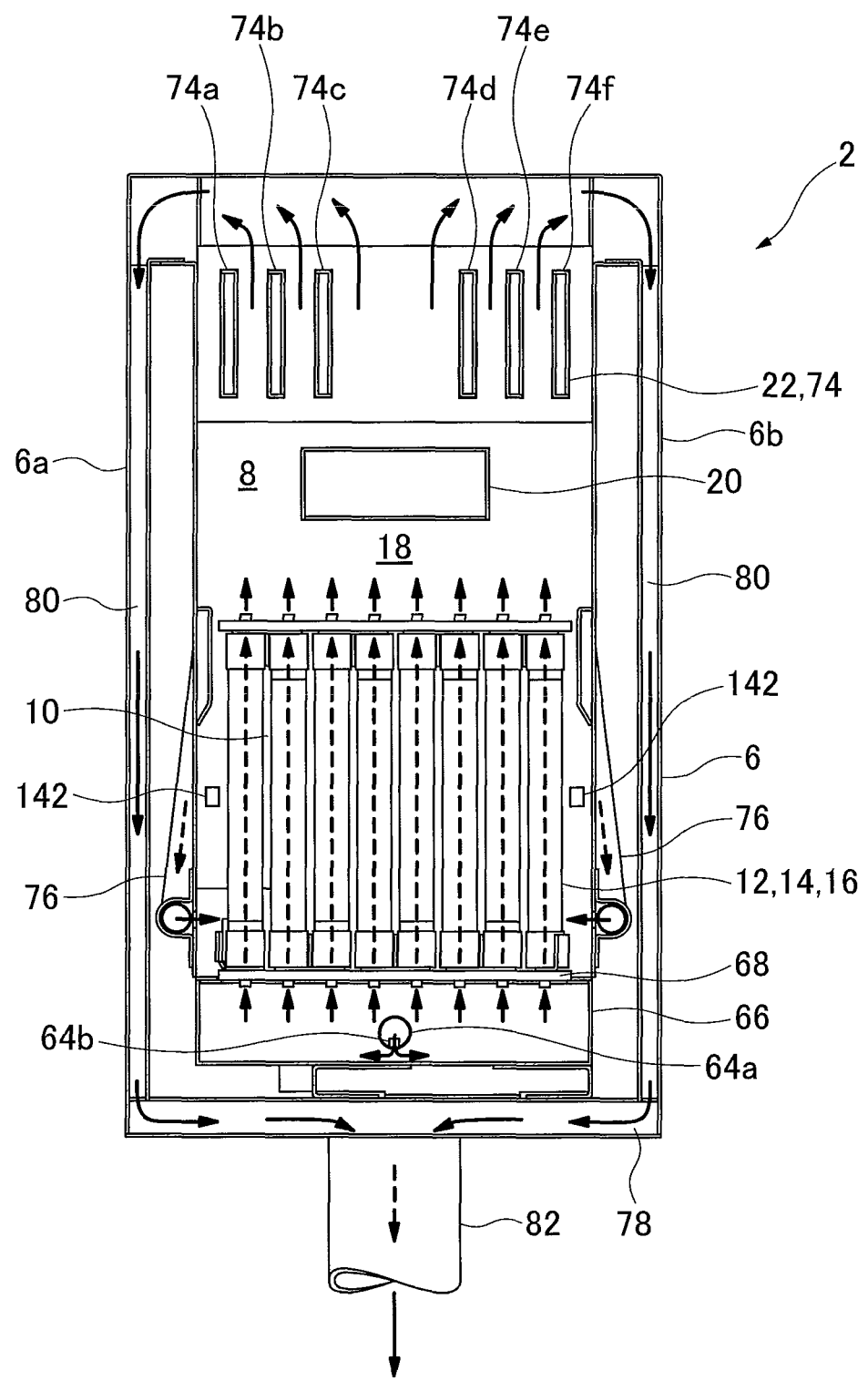
FIG. 3: A cross section along line in FIG. 2.

Next, using FIGS. 2 and 3, we explain the internal structure of a solid oxide fuel cell system (SOFC) according to the present embodiment of the invention. FIG. 2 is a side view cross section showing the fuel cell module in the solid oxide fuel cell system (SOFC) according to an embodiment of the invention. FIG. 3 is a cross section along line III-III of FIG. 2.

As shown in FIGS. 2 and 3, starting from the bottom in the sealed space 8 within the housing of the fuel cell module 2, the fuel cell assembly 12, the reformer 20, and the air heat exchanger 22 are arranged in sequence, as described above.

A pure water guide pipe 60 for introducing pure water into the upstream end of reformer 20, and a reform gas guide pipe 62 for introducing fuel gas and reforming air to be reformed, are attached to the reformer 20. A vaporizing section 20a and a reforming section 20b are formed in sequence starting from the upstream side within the reformer 20, and the reforming sections 20a and 20b are filled with reforming catalyst. Fuel gas and air, blended with steam (pure water) introduced into the reformer 20, is reformed using the reforming catalyst with which the reformer 20 is filled. Reforming catalysts in which nickel is applied to the surface of aluminum spheres, or ruthenium is imparted to the surface of aluminum spheres, are used as appropriate.

A fuel gas supply line 64 is connected to the downstream end of the reformer 20. The fuel gas supply line 64 extends downward, then further extends horizontally within a manifold formed under the fuel cell assembly 12. Multiple fuel supply holes 64b are formed on the bottom surface of a horizontal portion 64a of the fuel gas supply line 64. Reformed fuel gas is supplied into a manifold 66 from the fuel supply holes 64b.

A lower support plate 68 provided with through holes for supporting the above-described fuel cell stack 14 is attached at the top of the manifold 66, and fuel gas in the manifold 66 is supplied into fuel cell units 16.

Next, the air heat exchanger 22 is provided above the reformer 20. The air heat exchanger 22 comprises an air concentration chamber 70 on the upstream side and two air distribution chambers 72 on the downstream side. The air concentration chamber 70 and distribution chambers 72 are connected using six air flow conduits 74. As shown in FIG. 3, three air flow conduits 74 form a set (74a, 74b, 74c, 74d, 74e, 74f). Air in the air concentration chamber 70 flows from each set of the air flow conduits 74 to the respective air distribution chambers 72.

Air flowing in the six air flow conduits 74 of the air heat exchanger 22 is pre-heated by exhaust gas rising after combustion in the combustion chamber 18.

Air guide pipes 76 are connected to each of the air distribution chambers 72. The air guide pipes 76 extend downward, communicating at the bottom end side with the lower space in the generating chamber 10, and introducing preheated air into the generating chamber 10.

Next, an exhaust gas chamber 78 is formed below the manifold 66. As shown in FIG. 3, a vertically extending exhaust gas conduit 80 is formed inside of a front surface 6a and a rear surface 6b, which are faces in the longitudinal direction of the housing 6. The top end of the exhaust gas conduit 80 communicates with the space where the air heat exchanger 22 is disposed, and the bottom end communicates with the exhaust gas chamber 78. An exhaust gas discharge pipe 82 is connected at approximately the center of the bottom surface of the exhaust gas chamber 78. The downstream end of the exhaust gas discharge pipe 82 is connected to the above-described hot water production device 50 shown in FIG. 1.

As shown in FIG. 2, an ignition device 83 for starting combustion of fuel gas and air is disposed on the combustion chamber 18.

Figure 4:
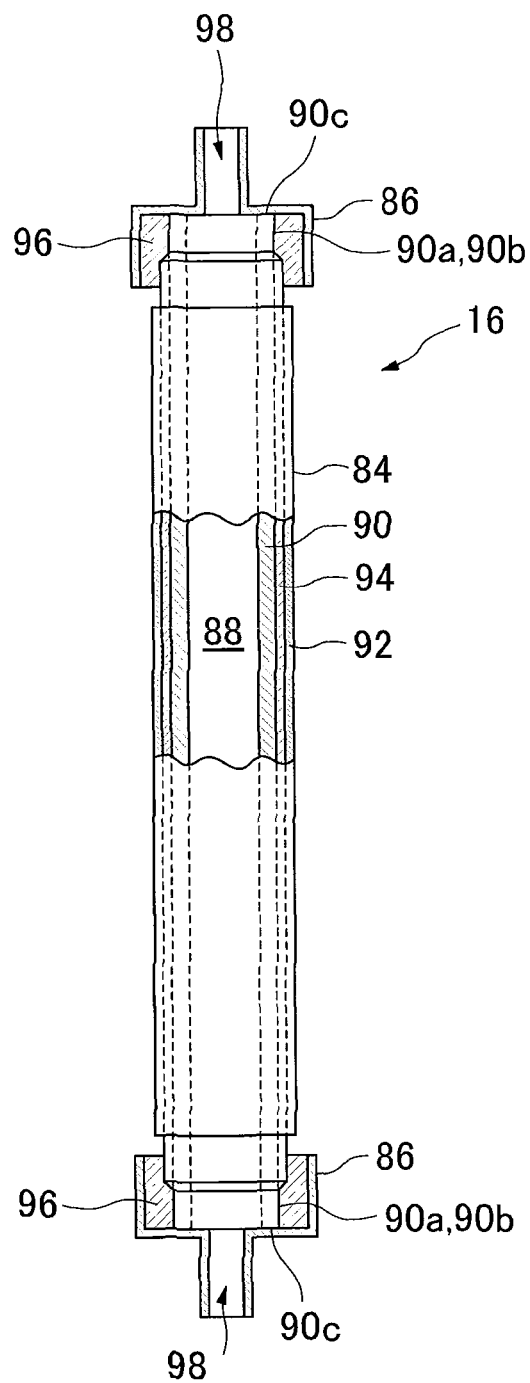
FIG. 4: A partial cross section showing an individual fuel cell unit in a fuel cell system according to an embodiment of the present invention.

Next, referring to FIG. 4, we explain the fuel cell units 16. FIG. 4 is a partial cross section showing the fuel cell units of the solid oxide fuel cell system (SOFC) according to an embodiment of the invention.

As shown in FIG. 4, the fuel cell units 16 are furnished with a fuel cell 84 and the internal electrode terminals 86, respectively connected to the terminals at the top and bottom of the fuel cell 84.

The fuel cell 84 is a tubular structure extending in the vertical direction, furnished with a cylindrical internal electrode layer 90, inside of which formed are a fuel gas flow path 88, a cylindrical external electrode layer 92, and an electrolyte layer 94 between the internal electrode layer 90 and the external electrode layer 92. The internal electrode layer 90 is a fuel electrode through which fuel gas passes, and has a (−) polarity, while the external electrode layer 92 is an air-contacting electrode with a (+) polarity.

The internal electrode terminals 86 attached at the top and bottom ends of the fuel cell units 16 have the same structure. Therefore, we here specifically discuss the internal electrode terminal 86 attached at the top end. The top portion 90a of the internal electrode layer 90 comprises an outside perimeter surface 90b and a top end surface 90c, exposed to the electrolyte layer 94 and the external electrode layer 92. The internal electrode terminal 86 is connected to the outer perimeter surface of the internal electrode layer 90 through a conductive seal material 96, and is electrically connected to the internal electrode layer 90 by direct contact with the top end surface 90c of the internal electrode layer 90. A fuel gas flow path 98 communicating with the internal electrode layer 90 through a fuel gas flow path 88 is formed at the center portion of the internal electrode terminal 86.

The internal electrode layer 90 is formed, for example, from at least one of the following: a mixture of Ni with zirconia doped with Ca or at least one rare earth element selected from among Y, Sc, or the like; a mixture of Ni with ceria doped with at least one element selected from among rare earth elements; or a mixture of Ni with lanthanum gallate doped with at least one element selected from among Sr, Mg, Co, Fe, or Cu.

An electrolyte layer 94 is formed, for example, from at least one of the following: zirconia doped with at least one type of rare earth element selected from among Y, Sc, or the like; ceria doped with at least one type of element selected from among rare earth elements; or lanthanum gallate doped with at least one element selected from Sr or Mg.

The external electrode layer 92 is formed, for example, from at least one of the following: lanthanum manganite doped with at least one element selected from among Sr or Ca; lanthanum ferrite doped with at least one element selected from among Sr, Co, Ni, or Cu; lanthanum cobaltite doped with at least one element selected from among Sr, Fe, Ni, or Cu; silver, or the like.

Figure 5:
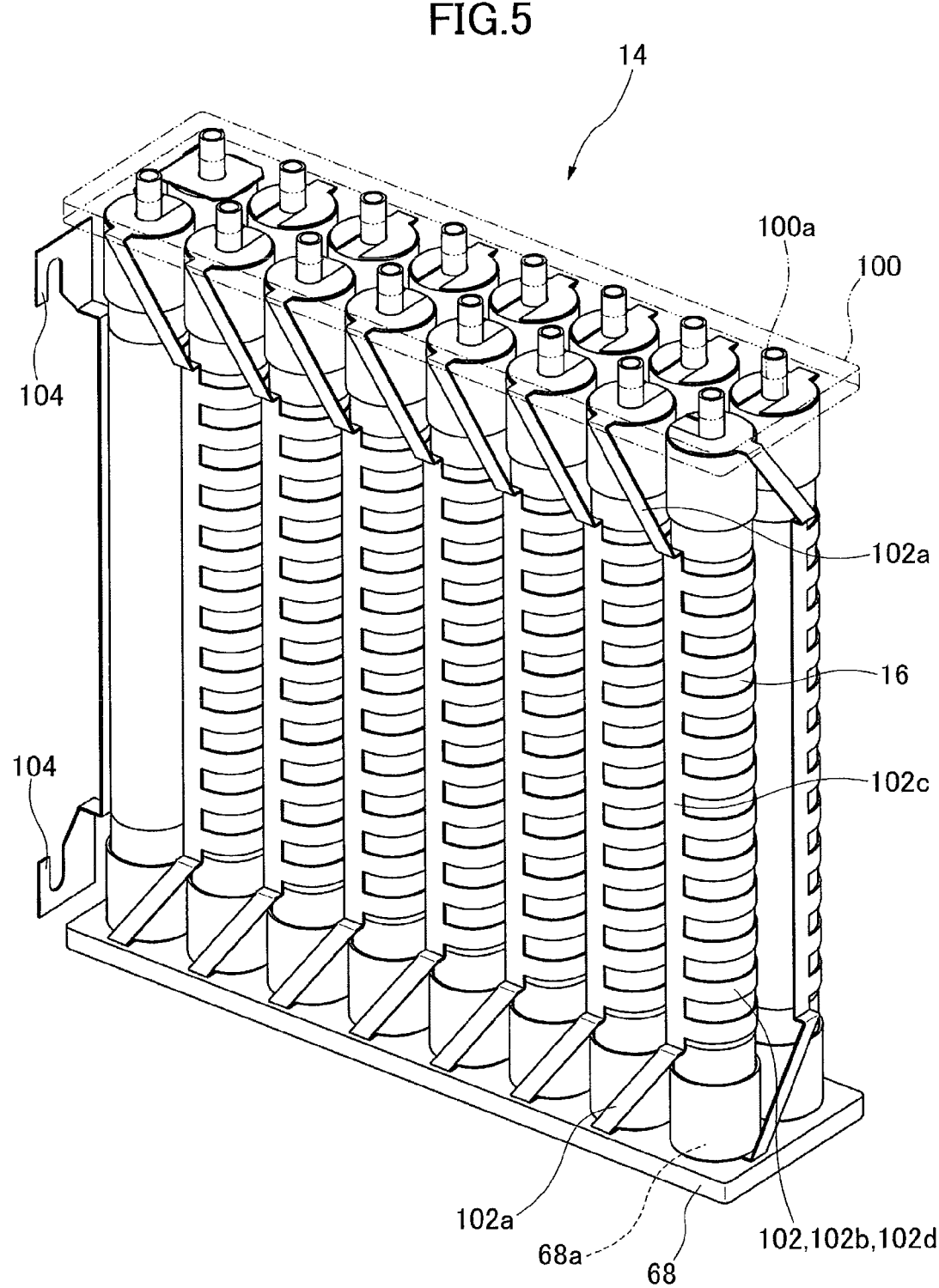
FIG. 5: A perspective view showing a fuel cell stack in a fuel cell system according to an embodiment of the present invention.

Next, referring to FIG. 5, we explain the fuel cell stack 14. FIG. 5 is a perspective view showing the fuel cell stack in a solid oxide fuel cell system (SOFC) according to an embodiment of the present invention.

As shown in FIG. 5, the fuel cell stack 14 is furnished with 16 fuel cell units 16. The top inside and bottom inside of the fuel cell units 16 are respectively supported by a lower support plate 68 and upper support plate 100. Through holes 68a and 100a, through which the internal electrode terminal 86 can penetrate, are provided on the lower support plate 68 and the outer support plate 100.

In addition, a collector 102 and an external terminal 104 are attached to the fuel cell units 16. The collector 102 is integrally formed by a fuel electrode connecting portion 102a, electrically connected to the internal electrode terminal 86 attached to the internal electrode layer 90 serving as the fuel electrode, and by an air electrode connecting portion 102b, electrically connected to the entire external perimeter of the external electrode layer 92 serving as the air electrode. The air electrode connecting portion 102b is formed of a plumb portion 102c extending vertically along the surface of the external electrode layer 92, and multiple horizontal portions 102d extending horizontally from the vertical portion 102c along the surface of the external electrode layer 92. The fuel electrode connecting portion 102a extends in a straight line, in an upward or downward diagonal direction from the vertical portion 102c of the air electrode connecting portion 102b, toward the internal electrode terminals 86 positioned vertically on the fuel cell units 16.

Furthermore, the internal electrode terminals 86 at the top and bottom ends of the two fuel cell units 16 positioned at the end of the fuel cell stack 14 (at the front and back on the left side in FIG. 5) are respectively connected to the external terminals 104. The external terminals 104 are connected to external terminals 104 (not shown) at the ends of the fuel cell stack 14 adjacent thereto, and as described above, all of the 160 fuel cell units 16 are connected in series.

Figure 6:
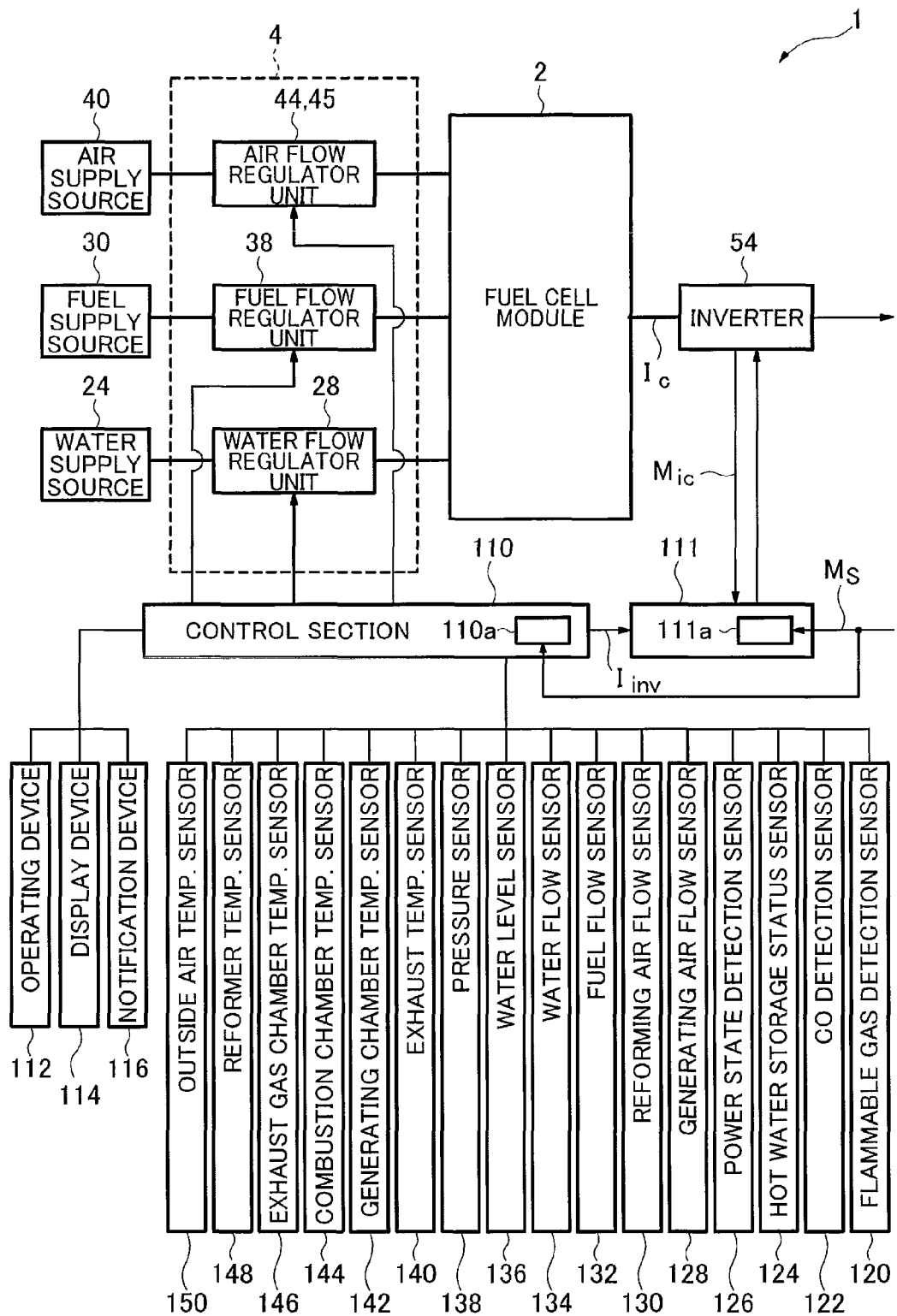
FIG. 6: A block diagram showing a fuel cell assembly according to an embodiment of the present invention.

Next, referring to FIG. 6, we discuss the sensors attached to the solid oxide fuel cell system (SOFC) according to the present embodiment. FIG. 6 is a block diagram showing a solid oxide fuel cell system (SOFC) according to an embodiment of the present invention.

As shown in FIG. 6, the solid oxide fuel cell system 1 comprises a control section 110. Connected to the control section 110 are: an operating device 112 provided with operating buttons such as "ON" or "OFF" for user operation; a display device 114 for displaying various data such as generator output (watts); and a notification device 116 for issuing warnings during abnormal states, etc. Note that this notification device 116 may also be connected to a remote control center to inform the control center of anomalies.

Next, signals from the various sensors described below are input to control section 110.

First, a flammable gas detection sensor 120 is for detecting gas leaks, and is attached to the fuel cell module 2 and the auxiliary unit 4.

A CO detection sensor 122 is for sensing whether CO in the exhaust gas, which is supposed to be exhausted to the outside via the exhaust gas conduit 80, etc., has leaked into the external housing (not shown) which covers the fuel cell module 2 and the auxiliary unit 4.

A water reservoir state detection sensor 124 is for sensing things such as the temperature and amount of hot water in a hot water heater (not shown).

An electrical power state detection sensor 126 is for sensing current, voltage, etc. in the inverter 54 and a distribution panel (not shown).

A generator air flow detection sensor 128 is for detecting the flow volume of generating air supplied to the generating chamber 10.

A reforming air flow volume sensor 130 is for detecting the volume of reforming air flow supplied to the reformer 20.

A fuel flow volume sensor 132 is for detecting the flow volume of fuel gas supplied to the reformer 20.

A water flow volume sensor 134 is for detecting the flow volume of pure water supplied to the reformer 20.

A water level sensor 136 is for detecting the water level in the pure water tank 26.

A pressure sensor 138 is for detecting pressure on the upstream side outside the reformer 20.

An exhaust temperature sensor 140 is for detecting the temperature of exhaust gas flowing into the hot water production device 50.

As shown in FIG. 3, a generating chamber temperature sensor 142 is disposed on the front surface side and rear surface side around the fuel cell assembly 12, and has the purpose of detecting the temperature near the fuel cell stack 14 and estimating the temperature of the fuel cell stack 14 (i.e., of the fuel cell 84 itself).

A combustion chamber temperature sensor 144 is for detecting the temperature in the combustion chamber 18.

An exhaust gas chamber temperature sensor 146 is for detecting the temperature of exhaust gases in the exhaust gas chamber 78.

A reformer temperature sensor 148 is for detecting the temperature of reformer 20. It calculates the reformer 20 temperature from the intake and exit temperatures on the reformer 20.

If the solid oxide fuel cell system (SOFC) is positioned outdoors, an outside air temperature sensor 150 detects the temperature of the outside atmosphere. Sensors to detect atmospheric humidity and the like may also be provided.

Signals from these various sensors are sent to control section 110; control section 110 sends control signals to the water flow regulator unit 28, the fuel flow regulator unit 38, the reforming air flow regulator unit 44, and the generating air flow regulator unit 45 based on data from the sensors, and controls the flow volumes in each of these units.

Figure 7:
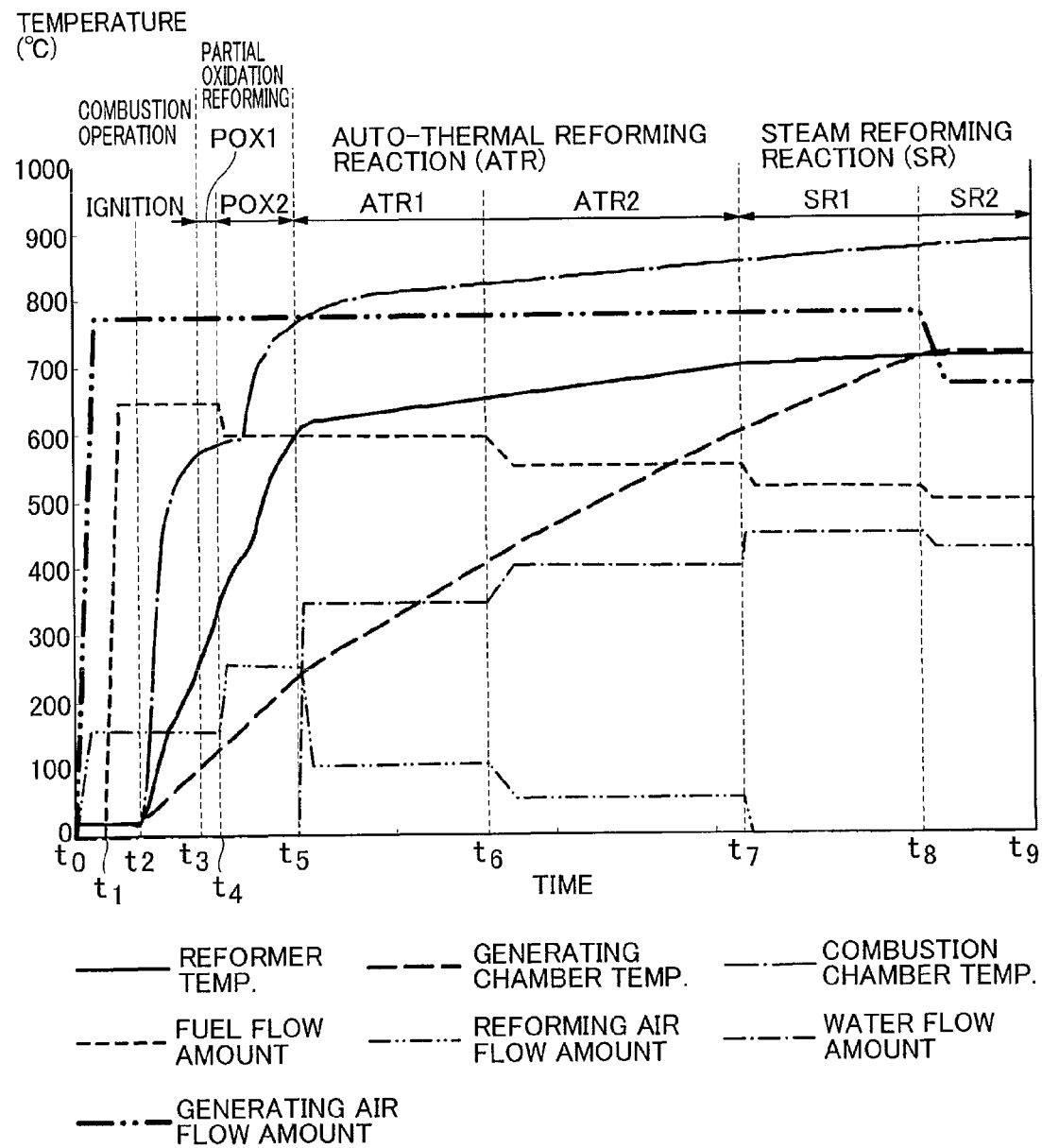
FIG. 7: A timing chart showing the operation at startup of a fuel cell assembly according to an embodiment of the present invention.

Next, referring to FIG. 7, we explain the operation of the solid oxide fuel cell system (SOFC) according to the present embodiment at the time of start up. FIG. 7 is a timing chart showing the operation of the solid oxide fuel cell system (SOFC) according to an embodiment of the present invention at the time of start up.

At first, the operation starts in a no-load state, i.e., with the circuit containing fuel cell module 2 being in the open state, in order to warm up the fuel cell module 2. At this point, current does not flow through the circuit. Therefore, the fuel cell module 2 does not generate electricity.

First, reforming air is supplied from the reforming air flow regulator unit 44 through the first heater 46 to the reformer 20 in the fuel cell module 2. Simultaneously, generating air is supplied from the generating air flow regulator unit 45 through the second heater 48 to the air heat exchanger 22 on the fuel cell module 2, and the generating air reaches the generating chamber 10 and the combustion chamber 18.

Immediately thereafter, fuel gas is also supplied from the fuel flow regulator unit 38, and fuel gas into which reforming air is blended passes through the reformer 20, the fuel cell stack 14, and the fuel cell units 16 to reach the combustion chamber 18.

Next, the ignition device 83 causes ignition, and fuel gas and air (reforming air and generating air) supplied to the combustion chamber 18 are combusted. The combusted fuel gas and air produces exhaust gas. The generating chamber 10 is warmed by this exhaust gas, and when the exhaust gas rises in the sealed space 8 of the fuel cell module 2, the fuel gas, which includes reforming air in the reformer 20, is warmed, as is also the generating air inside the air heat exchanger 22.

At this point, fuel gas into which reforming air is blended is supplied to the reformer 20 by the fuel flow regulator unit 38 and the reforming air flow regulator unit 44. Therefore, the partial oxidation reforming reaction PDX given by Expression (1) proceeds. The partial oxidation reforming reaction PDX is an exothermic reaction, and therefore has good startup characteristics. The elevated-temperature fuel gas is supplied from the fuel gas supply line 64 to the bottom of the fuel cell stack 14, and by this means, the fuel cell stack 14 is heated from the bottom. The combustion chamber 18 is also heated by the combustion of fuel gas and air, so that the fuel stack 14 is also heated from above, thereby enabling an essentially uniform rise in temperature along the vertical direction of the fuel cell stack 14. Even though the partial oxidation reforming reaction PDX is progressing, the ongoing combustion reaction between fuel gas and air is continued in the combustion chamber 18.

$$C_mH_n + xO_2 \rightarrow aCO_2 + bCO_2 + cH_2 \quad (1)$$

After the partial oxidation reforming reaction starts, when the reformer temperature sensor 148 senses that the reformer 20 has reached a predetermined temperature (e.g., 600° C.), a pre-mixture of fuel gas and reforming air is supplied to the reformer 20 by the water flow regulator unit 28, the fuel flow regulator unit 38, and the reforming air flow regulator unit 44. At this point, the auto-thermal reforming reaction ATR, which makes use of both the aforementioned partial oxidation reforming reaction PDX and the steam reforming reaction SR described below, proceeds in the reformer 20. The auto-thermal reforming reaction ATR can be internally thermally balanced. Therefore, the reaction proceeds in a thermally independent fashion inside the reformer 20. In other words, if oxygen (air) is abundant, heat emission by the partial oxidation reforming reaction PDX dominates, and if steam is abundant, the endothermic steam reforming reaction SR dominates. At this stage, the initial stage of startup has passed and some degree of elevated temperature has been achieved within the generating chamber 10. Therefore, even if the endothermic reaction is dominant, no major drop in temperature will be caused. Also, the combustion reaction continues within the combustion chamber 18 even while the auto-thermal reforming reaction ATR is proceeding.

When, after starting autothermal reforming reaction ATR, the reformer temperature sensor 146 senses that the reformer 20 has reached a predetermined temperature (e.g., 700° C.), the supply of reforming air by the reforming air flow regulator unit 44 is stopped and the supply of steam by the water flow regulator unit 28 is increased. A gas containing no air and containing only fuel gas and steam is thus supplied to the reformer 20, where the steam reforming reaction SR of Expression (3) proceeds.

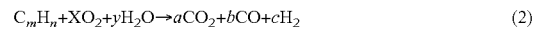

$$C_mH_n + xO_2 + yH_2O \rightarrow aCO_2 + bCO + cH_2 \quad (2)$$

$$C_mH_n + xH_2O \rightarrow aCO_2 + bCO + cH_2 \quad (3)$$

This steam reforming reaction SR is an endothermic reaction. Therefore, the reaction proceeds while thermal balance is maintained with the combustion heat from the combustion chamber 18. At this stage, the fuel cell module 2 is in the final stages of startup. Therefore, the temperature has risen to a sufficiently high level within the generating chamber 10 so that no major temperature drop is induced in the generating chamber 10 even though an endothermic reaction is proceeding. Also, the combustion reaction continues to proceed in the combustion chamber 18 even though the steam reforming reaction SR is proceeding.

In this manner, after the fuel cell module 2 has been ignited by the ignition device 83, the temperature inside the generating chamber 10 gradually rises due to the sequentially proceeding partial oxidation reforming reaction PDX, the auto-thermal reforming reaction ATR, and the steam reforming reaction SR. Next, when the temperatures of the interior of the generating chamber 10 and the individual fuel cells 84 reach a predetermined generating temperature below the rated temperature at which the fuel cell module 2 can be stably operated, the circuit including the fuel cell module 2 is closed and electrical generation by fuel cell module 2 begins, such that current flows in the circuit. Generation of electricity by the fuel cell module 2 causes the fuel cell 84 to emit heat, such that the temperature of the fuel cell 84 also rises. As a result, the rated temperature for operating the fuel cell module 2, for example 600 [° C.] to 800 [° C.], is reached.

In order to maintain the rated temperature thereafter, fuel gas and air are supplied in a quantity greater than the fuel gas and air consumed by the individual fuel cells 84, and combustion in the combustion chamber 18 is continued. Note that during electrical generation, generation of electricity by the high reforming-efficiency steam reforming reaction SR proceeds.

Figure 8:
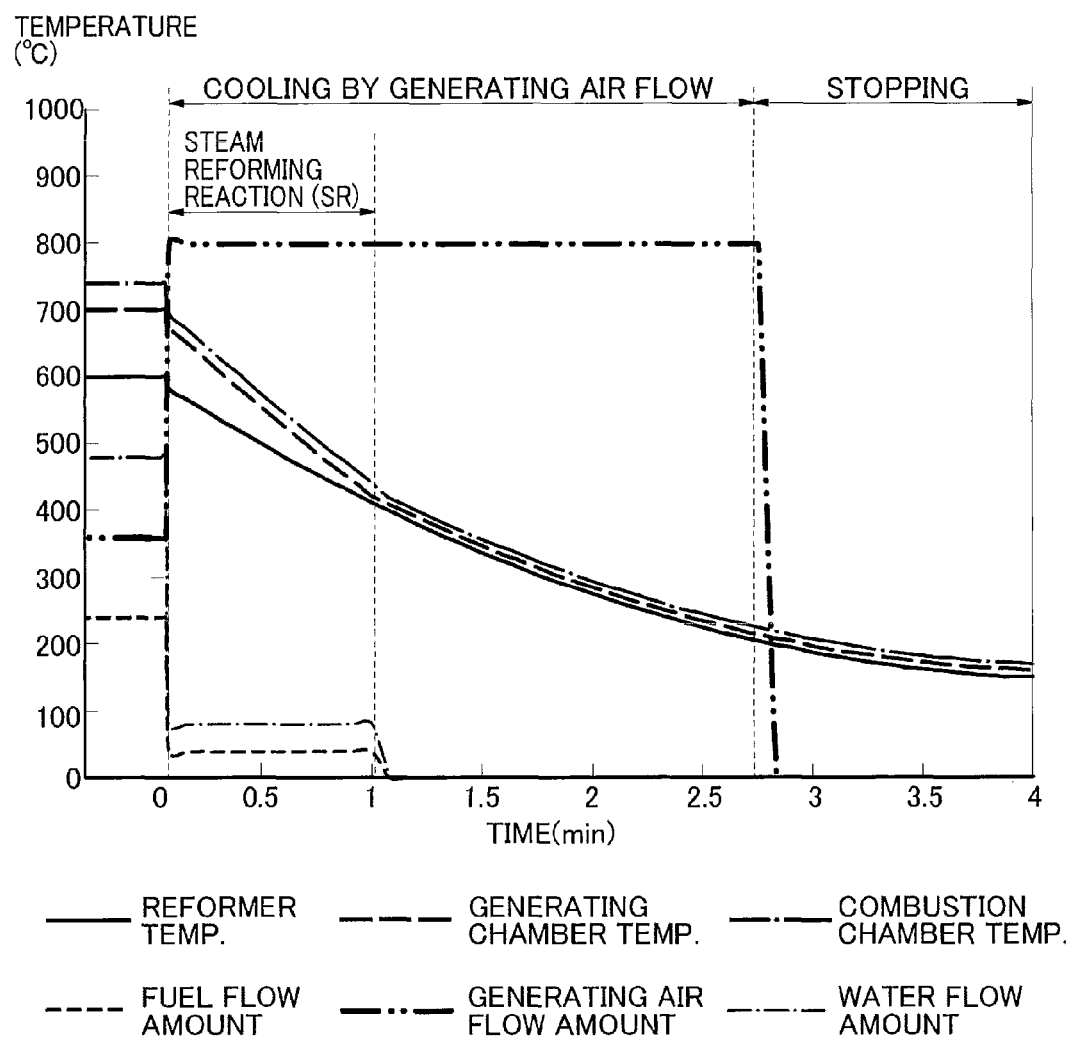
FIG. 8: A timing chart showing the operation of a fuel cell system according to an embodiment of the present invention when stopped.

Next, referring to FIG. 8, we discuss the operation when stopping the solid oxide fuel cell system (SOFC) of the present embodiment. FIG. 8 is a timing chart showing what occurs upon stopping the operation of the solid oxide fuel cell system (SOFC) of the present embodiment.

As shown in FIG. 8, when the operation of the fuel cell module 2 is stopped, the fuel flow regulator unit 38 and the water flow regulator unit 28 are first controlled to reduce the quantity of fuel gas and steam being supplied to the reformer 20.

When stopping the operation of the fuel cell module 2, the amount of generating air supplied by the reforming air flow regulator unit 44 into the fuel cell module 2 is being increased at the same time that the amount of fuel gas and steam being supplied to the reformer 20 is being reduced. The fuel cell assembly 12 and the reformer 20 are air cooled to reduce their temperatures. Thereafter, when the reformer 20 temperature has dropped to a predetermined temperature, for example 400 [° C.], the supply of fuel gas and steam to the reformer 20 is stopped, and the reformer 20 steam reforming reaction SR is ended. Supply of generating air continues until the temperature in the reformer 20 reaches a predetermined temperature, e. g. 200° C., and when the predetermined temperature is reached, the supply of generating air from the generating air flow regulator unit 45 is stopped.

Thus, in the present embodiment, when operation of the fuel cell module 2 is stopped, the steam reforming reaction SR by the reformer 20 and cooling by generating air are used in combination, so that operation of the fuel cell module can be stopped relatively quickly.

Next, referring to FIG. 6, we explain the control of the solid oxide fuel cell system 1 according to an embodiment of the invention.

First, as shown in FIG. 6, the solid oxide fuel cell system 1 comprises the control section 110, which is a fuel cell controller, and an inverter control section 111, which is an inverter controller.

Figure 15:
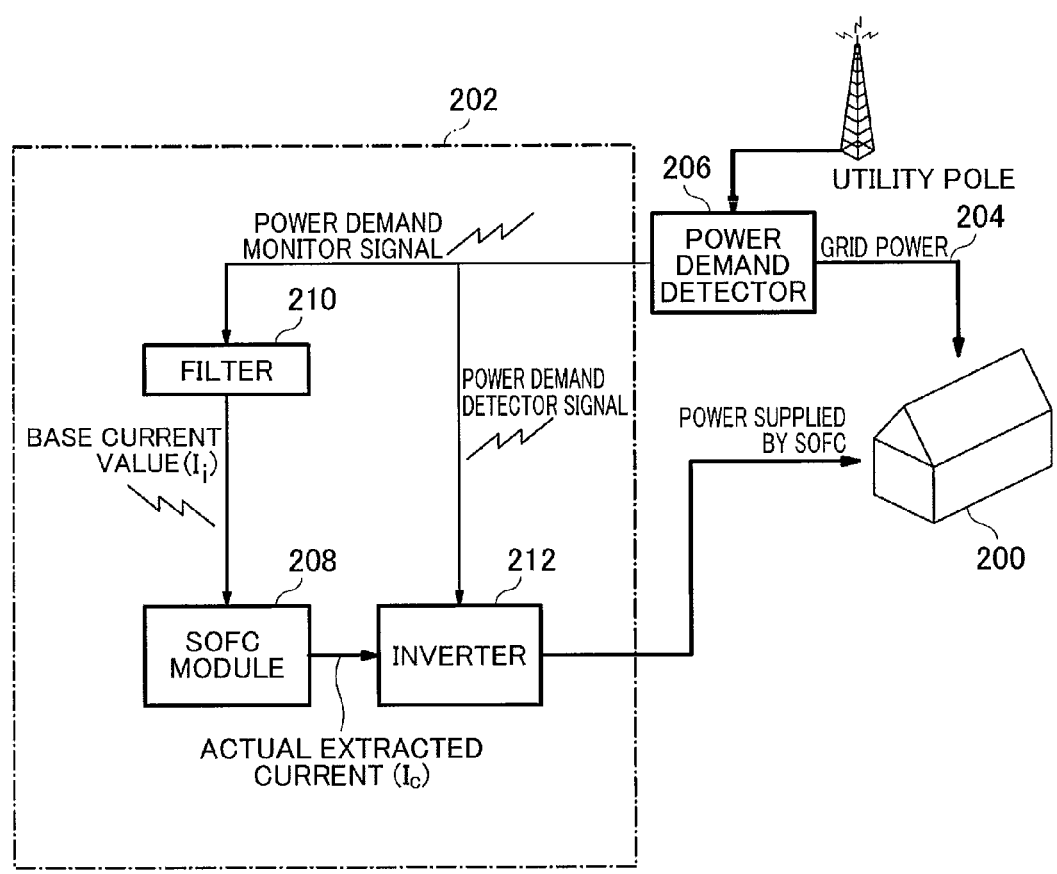
FIG. 15: An example of a conventional system for supplying electrical power to a residence using a fuel cell.

The control section 110 comprises a first power demand detection device 110a, which detects power demand based on a power demand signal Ms input from a power demand detector 206 (FIG. 15). The total power demand consumed by facilities like the residence 200 (FIG. 15) is covered by grid power supplied from commercial power sources and power supplied from the solid oxide fuel cell system 1. If using a current transformer as the power demand detector 206, the grid current (purchased current) can be obtained as a monitor signal to serve as a power demand monitor signal Ms. Therefore, power demand can be obtained, together with grid power and electrical generation interconnected power, from the AC voltage at the output terminal obtained from the inverter 54, and from the electrical generation interconnected output power. The first power demand detection device 110a can also be used, by indirectly obtaining that information from the inverter 54. In the present embodiment, it is the grid power of the total power demand that is input to the control section 110 as the power demand monitor signal Ms. But it is also possible for the control section to use total power demand as the power demand monitor signal.

Also, the control section 110 is constituted to control the water flow volume regulator unit 28, the fuel flow regulator unit 38, and the reform air flow regulator unit 44, etc. based on the power demand monitor signal Ms and the like. The control section 110 sets the extractable current value Iinv based on input signals from various sensors and on the power demand monitor signal Ms, and outputs the extractable current value to the inverter control section 111. Specifically, the control section 110 comprises a microprocessor, memory, programs for operating these, and so forth.

The inverter control section 111 comprises a second power demand detection device 111a, and detects power demand based on the power demand monitor signal Ms input from the power demand detector 206 (FIG. 15). When using a current transformer for the power demand detector 20, the grid current (purchased current) is obtained as a monitor signal for use as the power demand monitor signal Ms. Therefore, power demand is obtained together with grid power and electrical generation interconnected power using an output terminal AC voltage from a voltage detection means provided on an output terminal, obtained from the inverter 54, and the electrical generation interconnected output power from an output power detection means on the output section. That information can also be conveyed to the control section 110. The inverter control section 111 controls the inverter 54 based on the power demand monitor signal Ms and the extractable current value Iinv input from the control section 110, and the actual extracted current Ic is extracted from the fuel cell module 2 within a range not exceeding the extractable current value Iinv. Specifically, the inverter control section 111 comprises a microprocessor, memory, programs for operating these, and the like.

The control section 110 comprises an extractable current setting means for sequentially setting the extractable current value Iinv, which is the maximum current extractable from the fuel cell module 2 at a given time in response to the state of the fuel cell module 2. The inverter control section 111 controls the inverter 54 independently of the control section 110, extracts the actual extracted current Ic in a range not exceeding the extractable current value Iinv input from the control section 110, and supplies facilities such as the residence 200 (FIG. 15). Note that in the present embodiment, the control section 110 control cycle is 500 [msec], and the inverter control section 111 control cycle is 1 [msec] or less. Thus, the control section 110 is operated at a control cycle necessary and sufficient to control slow-response of the fuel cell module 2, and the inverter control section 111 is operated at a short control cycle so that power can be extracted from the inverter 54 in response to power demand, which fluctuates rapidly. Also, control of the control section 110 and control of the inverter control section 111 are not synchronized, and the inverter 54 is controlled independently of the control section 110 based on the extractable current value Iinv input from the control section 110, and on the power demand monitor signal Ms.

Figure 10:
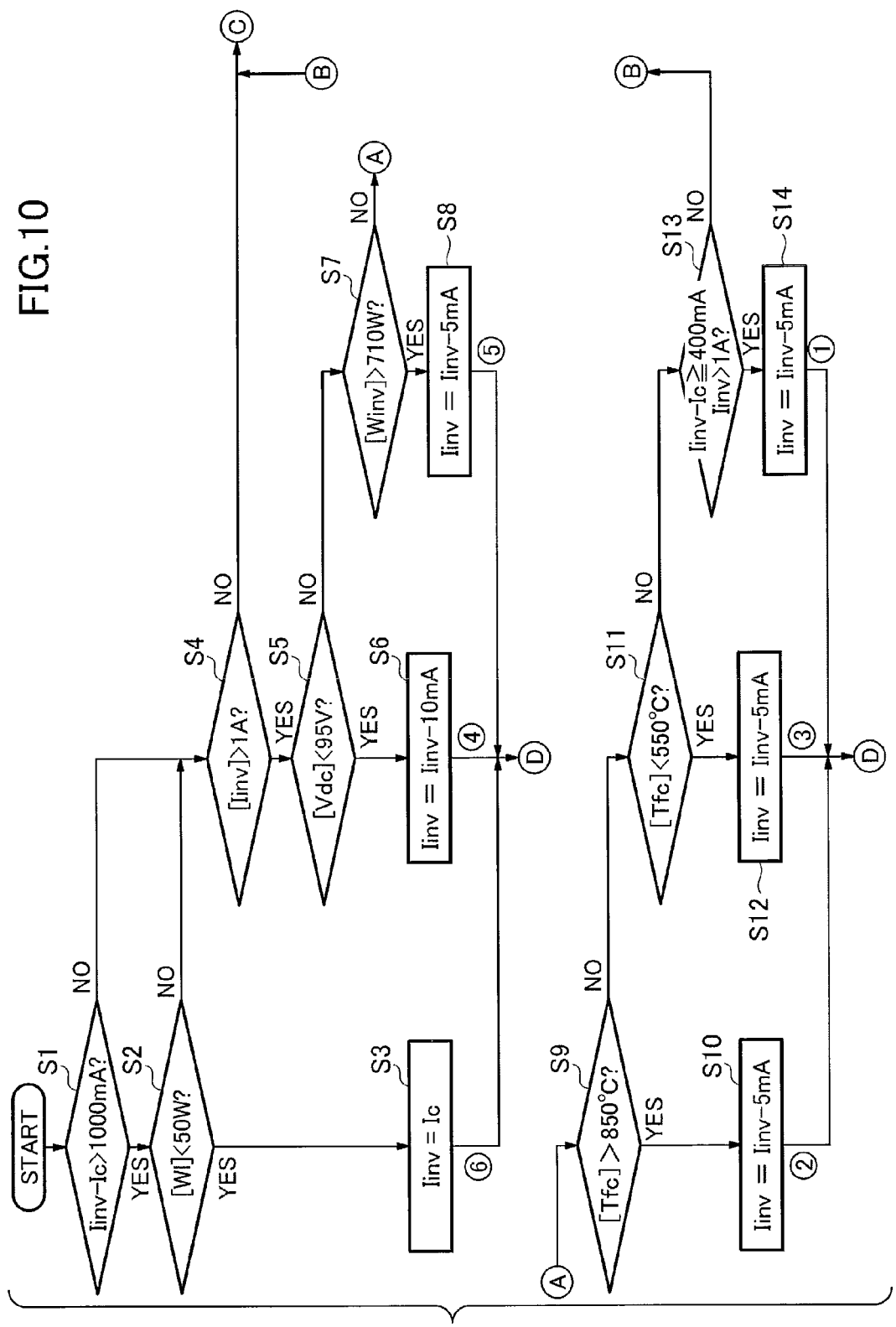
FIG. 10: A flow chart showing control executed by a control section.
Figure 11:
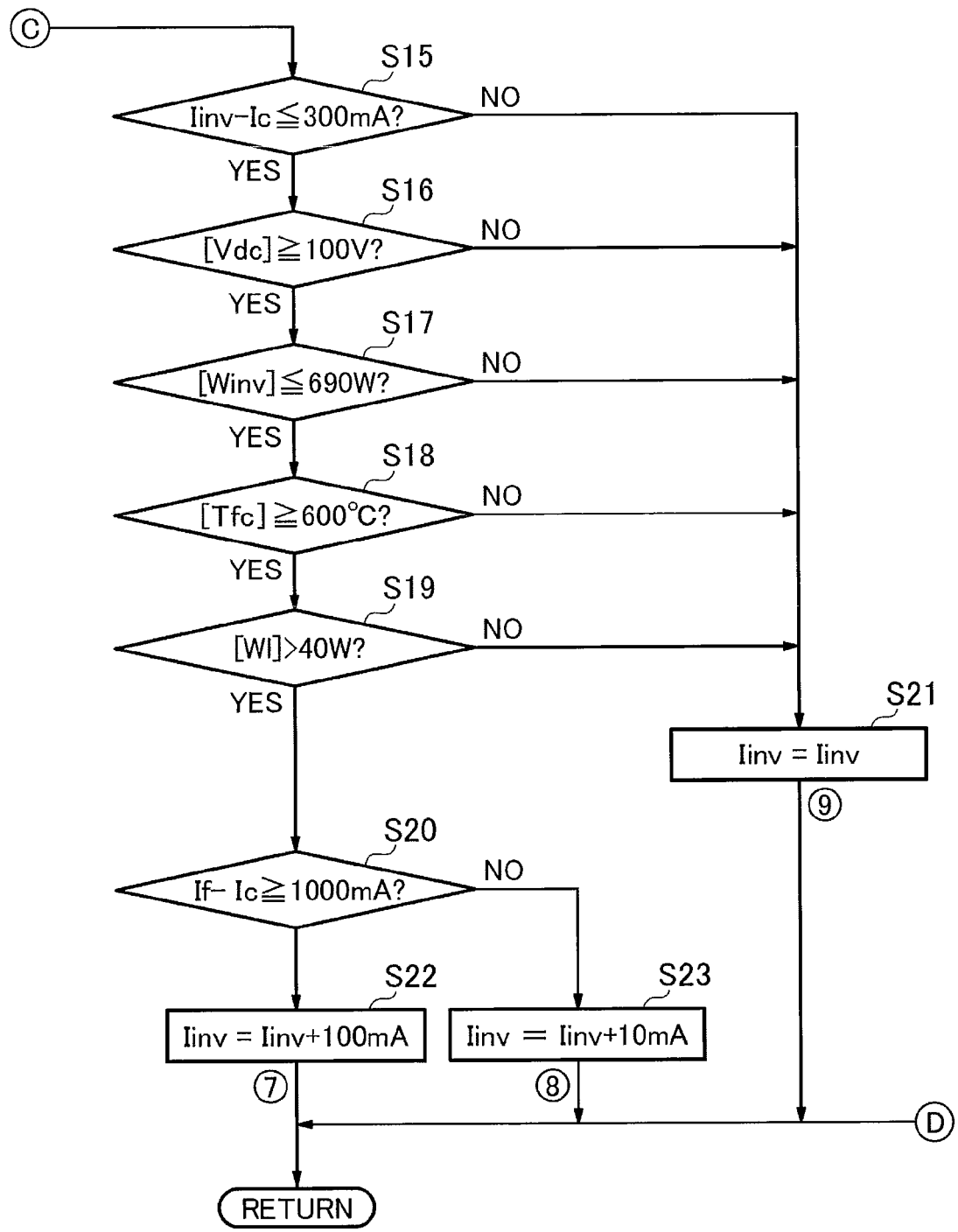
FIG. 11: A flow chart showing control executed by a control section.

Next, referring to FIGS. 9 through 14, we explain the operation of the solid oxide fuel cell system 1 according to an embodiment of the invention. FIG. 9 is a control table for setting the extractable current value Iinv using the control section 110. FIGS. 10 and 11 are flowcharts for determining the extractable current value Iinv by applying the control table shown in FIG. 9.

As shown in FIG. 9, the control section 110 increases, decreases, or maintains the extractable current value Iinv based on a generating chamber temperature Tfc, a generating voltage Vdc output from the fuel cell module 2, a grid power WI, which is the power supplied to facilities such as residences from commercial power sources, an interconnect power Winv, which is the power output from the inverter 54, and a fuel supply current value If.

The generating chamber temperature Tfc is the temperature of the generating chamber 10 housed in the individual fuel cell units 16. It is detected by the generating chamber temperature sensors 142 and input to the control section 110. Note that in this Specification, temperatures serving as indicators of the fuel cell module 2 generating capacity, such as the generating chamber temperature Tfc, are referred to as the "fuel cell module temperature."

The generated voltage Vdc is the output voltage output from the fuel cell module 2. A grid power WI is the power supplied by commercial power sources to residences and the like, which corresponds to the total facility power demand minus power supplied by the fuel cells, and is detected based on the power demand monitor signal Ms.

The interconnect power Winv is the power output from the inverter 54. Power actually extracted at the inverter 54 from the fuel cell module 2 is detected by the power state detecting sensor 126, and power converted from this power is output from the inverter 54. The actual extracted current Ic [A], actually output from the fuel cell module 2, is obtained based on the power detected by the power state detecting sensor 126. Therefore, the power state detecting sensor 126 functions as an extracted current detection device.

The fuel supply current value If is a base current value for obtaining the fuel supply amount, and corresponds to the current value which can be generated using the fuel supply amount (L/min) supplied to the fuel cell module 2. Therefore, the fuel supply current value If is set so as not to fall below the extractable current value Iinv.

The control section 110 determines whether the current state of the fuel cell module 2 matches any one of line Nos. 1 through 9 in FIG. 9, and changes or maintains the extractable current value Iinv shown on the right-most column of FIG. 9.

For example, if all the conditions noted in line No. 1 of FIG. 9 are simultaneously met, the control section 110 changes the extractable current value Iinv to reduce it by 5 [mA], as shown in the right column of line No. 1. As explained above, in the present embodiment, the control cycle of the control section 110 is 500 [msec]. Therefore, if the state continues in which the line No. 1 conditions are met, the extractable current value Iinv is lowered by 5 [mA] every 500 [msec]. In this case, the extractable current value Iinv is reduced at a current reduction rate of 10 [mA/sec].

Similarly, if all the conditions noted in line No. 8 of FIG. 9 are simultaneously met, the control section 110 changes the extractable current value Iinv so as to increase it by 10 [mA], as shown in the right hand column of line No. 8. Therefore, if the state continues in which the line No. 8 conditions are met, the extractable current value Iinv is raised at a first current increase rate of 20 [mA/sec].

If none of the conditions in line Nos. 1-8 of FIG. 9 is satisfied, then the line No. 9 condition is matched, and the extractable current value Iinv is maintained without any changes.

Next, referring to FIGS. 10 and 11, we explain the procedure for judging the FIG. 9 control table conditions. Note that letters A-D in FIGS. 10 and 11 indicate processing endpoints. For example, the flow transition from "C" in FIG. 10 to "C" in FIG. 11.

As explained below, even under conditions when the extractable current value Iinv should be increased, such as when power demand is increasing, the control section 110 increases the extractable current value Iinv only when none of the predetermined multiple increase limit conditions is met. Furthermore, the increase limit conditions include multiple current reducing conditions and current maintenance conditions, and when these conditions are met, the extractable current value Iinv is reduced or maintained. The multiple current reducing conditions (steps S5, S7, S9, S11, and S13 in FIG. 10) are applied with priority before the multiple current maintenance conditions (steps S15, S16, S17, S18, and S19 in FIG. 11).

First, step S1 in FIG. 10 is a step for judging whether an extremely large deviation has occurred between the extractable current value Iinv and the actual extracted current Ic, or a judgment is made as to whether a deviation of greater than 1000 [mA] has occurred between the two. The case in which a deviation larger than 1000 [mA] occurs for the first time during a control cycle when the difference between the extractable current value Iinv and the actual extracted current Ic is small is the case in which a sharp reduction in the total power demand occurs, or the actual extracted current Ic is sharply reduced for some reason, producing a deviation, in which case the process advances to step S2.

In step S2, a judgment is made as to whether the grid power WI is less than 50 [W]. If the grid power WI is less than 50 [W], there is a high possibility that a "reverse current flow (the grid power WI turns negative)" may occur, and output power from the inverter 54 flows into the commercial power supply. Therefore, this state is judged to be one in which the inverter 54 has suddenly reduced the actual extracted current Ic in order to prevent an occurrence of a reverse current flow due to a large drop in the total power demand according to the determinations made in S2 and S1. Note that the reason for setting the value of the grid power WI in S2 at 50 [W] is to provide a 50 [W] margin so that a reverse current flow will not occur under any circumstance.

Next, if it is YES in both S1 and S2, i.e., in cases when an anti-reverse current flow control is performed by the inverter 54 in conjunction with a large drop in total power demand, the control section 110 in step S3 steeply reduces the value of the extractable current value Iinv instructed to the inverter control section 111 down to the value of the actual extracted current Ic (corresponding to FIG. 9, No. 6). With the completion of the process in step S3, one iteration of the FIG. 10 and FIG. 11 flowcharts is completed. The inverter 54 extracts the actual extracted current Ic in a range not exceeding the extractable current Iinv. Therefore, by reducing the extractable current value Iinv such that the extractable current value Iinv=the actual extracted current Ic, the inverter 54 is restricted from responding or from arbitrarily increasing the extracted current beyond the current extracted current value Ic. If the total power demand sharply drops, there is a high possibility that the total power demand will soon quickly recover (increase) But if the inverter 54 quickly extracts power in order to respond to the recovered total power demand when there is a large deviation exceeding 1000 [mA], there can be a control overshoot or the like resulting in that the inverter 54 performs a power extraction which exceeds power demand or the extractable current value Iinv. This is prevented in advance. In other words, with a small deviation such as 1000 [mA] or less, the inverter 54 is allowed to quickly perform a power extraction up to the extractable current value Iinv, which is at a higher level than the actual extracted current Ic, since no control is executed to cause the extractable current value Iinv to be the actual extracted current Ic. This is a further measure taken to enable quick following of the recovery of the total power demand, since no problem such as excessive power extraction due to overshoot arises if the deviation is small.

On the other hand, if a judgment is made in the step S1 and S2 that the situation is not one in which a reverse current associated with a very large drop in the total power demand will arise, the process advances to step S4. In step S4 a judgment is made as to whether the extractable current value Iinv is greater than 1 A. If the extractable current value Iinv is greater than 1 A, the process advances to step S5, and a judgment is made as to whether the generating voltage Vdc is less than 95 V. If the generating voltage Vdc is less than 95 V, the process advances to step S6.

In step S6, the control section 110 reduces the extractable current value Iinv instructed to the inverter control section 111 by 10 [mA] (corresponding to line No. 4 in FIG. 9). With the completion of the step S6 process, one iteration of the FIG. 10 and FIG. 11 flowcharts is completed. If the process in step S6 is continuously executed each time the FIG. 10 flowchart is executed, the extractable current value Iinv is decreased at a current decrease rate of 20 [mA/sec]. If the generating voltage Vdc is less than 95 V, a voltage decrease is assumed to occur due to degradation of the fuel cell module when power is extracted at the inverter 54 from the fuel cell module 2. Therefore, by reducing the extractable current value Iinv, the current extracted at the inverter 54 is suppressed, thereby lightening the load imposed on the fuel cell module 2.

Meanwhile, if the generating voltage Vdc is 95 V or greater in step S5, the process advances to step S7. In step S7 a judgment is made as to whether the interconnect power Winv exceeds 710 W. If the interconnect power Winv exceeds 710 W, the process advances to step S8, and in step S8, the control section 110 reduces the extractable current value Iinv instructed to the inverter control section 111 by 5 [mA] (corresponding to line No. 5 in FIG. 9). In other words, if the interconnect power Winv exceeds 710 [W], the output power from the fuel cell module 2 exceeds the rated power. Therefore, the current extracted from the fuel cell module 2 is reduced so as not to exceed the rated power. With the completion of the process in step S8, one iteration of the FIG. 10 and FIG. 11 flowcharts is completed. If the process in step S8 is continuously executed each time the FIG. 10 flowchart is executed, the extractable current value Iinv is decreased at a current decrease rate of 10 [mA/sec].

Thus, by applying the multiple current reduction conditions, the control section 110 changes the extractable current value Iinv so that the rates at which the extractable current value Iinv is reduced differ.

In step S7, meanwhile, if the interconnect power Winv is 710 [W] or less, the process advances to step S9. In step S9, a judgment is made as to whether the generating chamber temperature Tfc exceeds 850 [° C.]. If the generating chamber temperature Tfc exceeds 850 [° C.], the process advances to step S10. In step S10, the control section 110 reduces the extractable current value Iinv instructed to the inverter control section 111 by 5 [mA] (corresponding to line No. 2 in FIG. 9). That is, if the generating chamber temperature Tfc exceeds 850 [C], the appropriate operating temperature for the fuel cell module 2 is exceeded. Therefore, the extractable current Iinv is reduced and the system waits for a drop in the temperature. With the completion of the process in step S10, one iteration of the FIG. 10 and FIG. 11 flowcharts is completed. If the process in step S10 is continuously executed each time the FIG. 10 flowchart is executed, the extractable current value Iinv is decreased at a current decrease rate of 10 [mA/sec].

On the other hand, if the generating chamber temperature Tfc is 850 [C] or less in step S9, the process advances to step S11. In step S11, a judgment is made as to whether the generating chamber temperature Tfc is less than 550 [C]. If the generating chamber temperature Tfc is less than 550 [° C.], the process advances to step S12. In step S12, the control section 110 reduces the extractable current value Iinv instructed to the inverter control section 111 by 5 [mA] (corresponding to line No. 3 in FIG. 9). In other words, if the generating chamber temperature Tfc is less than 550 [C], the temperature is below the appropriate temperature at which the fuel cell module 2 can generate electricity, so the extractable current Iinv is reduced. Fuel consumed for electrical generation is thus reduced, and fuel is directed to heating the individual fuel cell units 16, raising their temperature. With the completion of the process in step S12, one iteration of the FIG. 10 and FIG. 11 flowcharts is completed. If the process in step S12 is continuously executed each time the FIG. 10 flowchart is executed, the extractable current value Iinv is decreased at a current decrease rate of 10 [mA/sec].

On the other hand, if the generating chamber temperature Tfc is 550 [° C.] or greater in step S11, the process advances to step S13. In step S13, a judgment is made as to whether the difference between the extractable current value Iinv and the actual extracted current Ic exceeds 400 [mA] and the extractable current value Iinv exceeds 1 A. If the difference between the extractable current value Iinv and the actual extracted current Ic exceeds 400 [mA] and the extractable current value Iinv exceeds 1 A, the process advances to step S14, and in step S14, the control section 110 reduces the extractable current value Iinv instructed to the inverter control section 111 by 5 [mA] (corresponding to line No. 1 in FIG. 9). In other words, if the difference between the extractable current value Iinv and the actual extracted current Ic exceeds 400 [mA], there is too little current Ic actually extracted from the fuel cell module 2 relative to the extractable current value Iinv which can be extracted, and fuel is being wastefully supplied, so the extractable current Iinv is reduced and fuel wastage is suppressed. With the completion of the processing in step S14, one iteration of the FIG. 10 and FIG. 11 flowcharts is completed. If the process in step S14 is continuously executed each time the FIG. 10 flowchart is executed, the extractable current value Iinv is decreased at a current decrease rate of 10 [mA/sec].

Thus, if even one of the multiple current reduction conditions (steps S5, S7, S9, S11, and S13 in FIG. 10) applies, the extractable current value Iinv is reduced even when the power demand is rising (steps S6, S8, S10, S12, S14).

In step S4, meanwhile, when the extractable current value Iinv is 1 [A] or less, and in step S13, when the difference between the extractable current value Iinv and the actual extracted current value Ic is 400 [mA] or less, the process advances to step S15 in FIG. 11.

In step S15, a judgment is made as to whether the difference between the extractable current value Iinv and the actual extracted current value Ic is 300 [mA] or less. In step S16, a judgment is made as to whether the generated voltage Vdc is 100 [V] or greater. In step S17, a judgment is made as to whether the extractable current value Iinv is 690 [W] or less. In step S18, a judgment is made as to whether the generating chamber temperature Tfc is 600 [C] or more. In step S19, a judgment is made as to whether the grid power WI exceeds 40 [W]. If all of these conditions are satisfied, the process advances to step S20. If there is even one of them not satisfied (corresponding to line No. 9 in FIG. 9), the process advances to step S21. In step S21, the extractable current value Iinv is not changed but maintained at the previous value, and one iteration of the FIG. 10 and FIG. 11 flowcharts is completed.

Thus, in the solid oxide fuel cell system 1 of the present embodiment, if certain conditions are not met, even when power demand is rising, the extractable current value Iinv is kept constant (step S21 in FIG. 11). Focusing on the generating chamber temperature Tfc, when the generating chamber temperature Tfc exceeds the upper limit threshold value of 850 [C], the extractable current value Iinv is lowered (steps S9, S10 in FIG. 10), and if the generating chamber temperature Tfc is less than the lower limit threshold value of 600 [° C.], the extractable current value Iinv is maintained (steps S18, S21 in FIG. 11). If the generating chamber temperature Tfc is even lower, below 550 [° C.], the extractable current value Iinv is reduced (steps S11, S12 in FIG. 10).

On the other hand, in the process which is performed in step S20 and beyond, the extractable current value Iinv is increased. The control section 110 increases the extractable current value Iinv (steps S22, S23 in FIG. 11) only when none of the multiple current maintenance conditions (steps S15, S16, S17, S18, and S19 in FIG. 11) is met.

That is, when the difference between the extractable current value Iinv and the actual extracted current Ic exceeds 300 [mA] (step S15), the difference between the extractable current value Iinv and the actual extracted current Ic is relatively large. Therefore, the extractable current value Iinv should not be increased. If the generating voltage Vdc is lower than 100 V (step S16), then the extractable current value Iinv should not be raised, increasing the current extractable from the fuel cell module 2. Furthermore, if the interconnect power Winv exceeds 690 [W] (step S17), the output power from the fuel cell module 2 has already essentially reached the rated output power. Therefore, the current which can be extracted from the fuel cell module 2 should not be increased.

In addition, if the generating chamber temperature Tfc is less than 600 [° C.] (step S18), the fuel cell module 2 has not reached a temperature at which electricity can be sufficiently generated. Therefore, the extractable current value Iinv should not be raised, and current extractable from the fuel cell module 2 is increased, thereby placing a load on the individual fuel cell units 16. If the grid power WI is less than 40 [W] (step S19), "reverse power flow" can easily occur. Therefore, the current extractable from the fuel cell module 2 should not be increased.

If all the conditions from steps S15 through S19 are met, the process advances to step S20. In step S20, a judgment is made as to whether the difference between the fuel supply current value If and the actual extracted current value Ic is 1000 [mA] or greater. A fuel gas supply amount corresponding to the fuel supply current value If is obtained and supplied to the fuel cell module 2, and the system is generating electricity. In other words, the value is a conversion of the electrical current value which can be generated by the fuel cell module 2 using that fuel. For example, if a fuel supply amount [L/min] corresponding to the fuel supply current value If=5 [A] is being supplied, the fuel cell module 2 is potentially capable of safely and stably outputting a 5 [A] current. Therefore, if the difference between the fuel supply current value If and the actual extracted current value Ic is 1000 [mA], this means that an amount of fuel capable of outputting 1 [A] more current than the actually generated extracted current value Ic is being supplied to the fuel cell module 2.

If, in step S20, the difference between the fuel supply current value If and the actual extracted current value Ic is 1000 [mA] or greater, the process advances to step S22. If less than 1000 [mA], the process advances to step S23. In step S22, because a large amount of extra fuel is being supplied to the fuel cell module 2, the control section 110 increases the extractable current value Iinv instructed to the inverter control section 111 by 100 [mA] (corresponding to line No. 9 in FIG. 9), rapidly raising the extractable current value Iinv. The completion of the step S22 process completes one iteration of the FIGS. 10 and 11 flowcharts. If the process in step S22 is continuously executed each time the FIG. 11 flowchart is executed, the extractable current value Iinv is raised at a second current increase rate, which is 200 [mA/sec].

On the other hand, the conditions for raising the extractable current value Iinv are present in step S23, but since this is not a situation in which a large amount of extra fuel is being supplied to the fuel cell module 2, the control section 110 increases the extractable current value Iinv instructed to the inverter control section 111 by 10 [mA] (corresponding to line No. 8 in FIG. 9), gradually raising the extractable current value Iinv. With the completion of the processing in step S23, one iteration of the FIG. 10 and FIG. 11 flowcharts is completed. If the process in step S23 is continuously executed each time the FIG. 11 flow chart is executed, the extractable current value Iinv will be increased at the first current increase rate of 20 [mA/sec].

Figure 12:
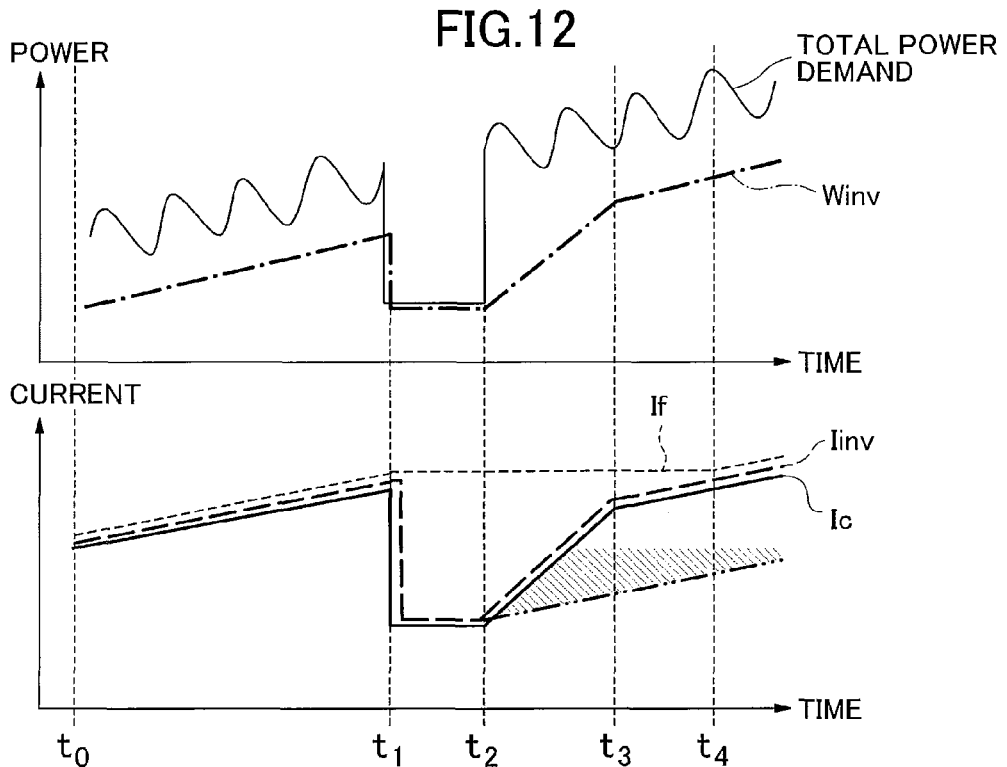
FIG. 12: A timing chart showing the operation of a fuel cell system according to an embodiment of the present invention.
Figure 13:
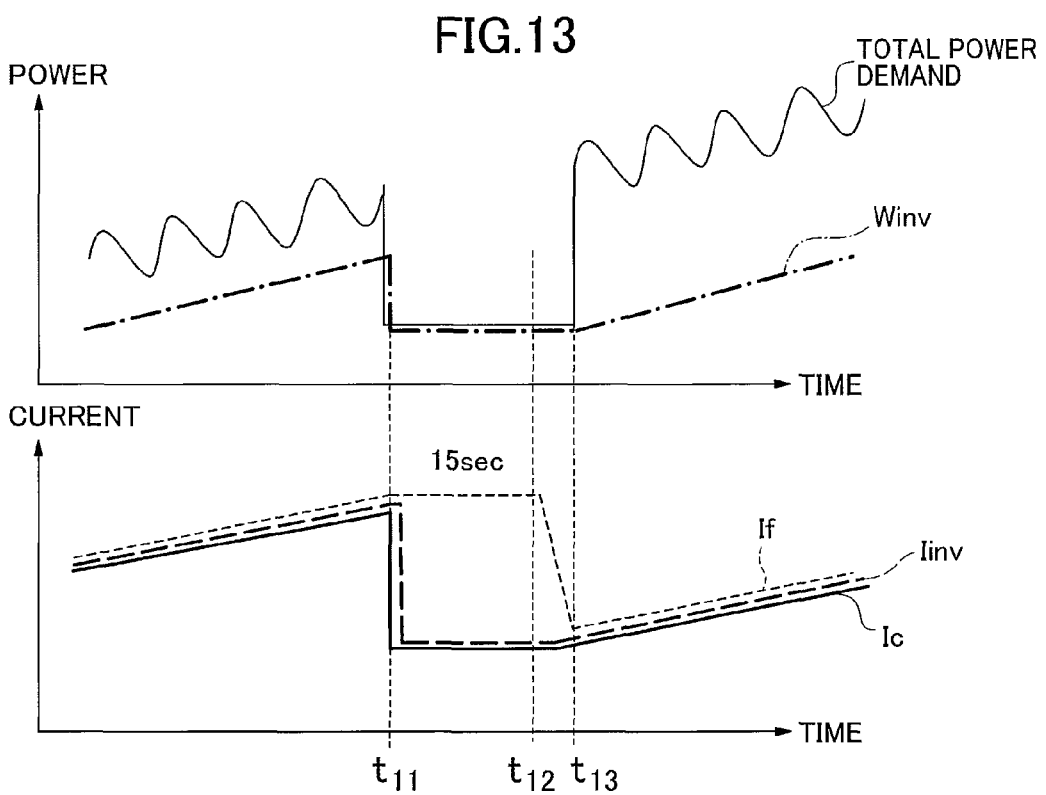
FIG. 13: A timing chart showing the operation of a fuel cell system according to an embodiment of the present invention.
Figure 14:
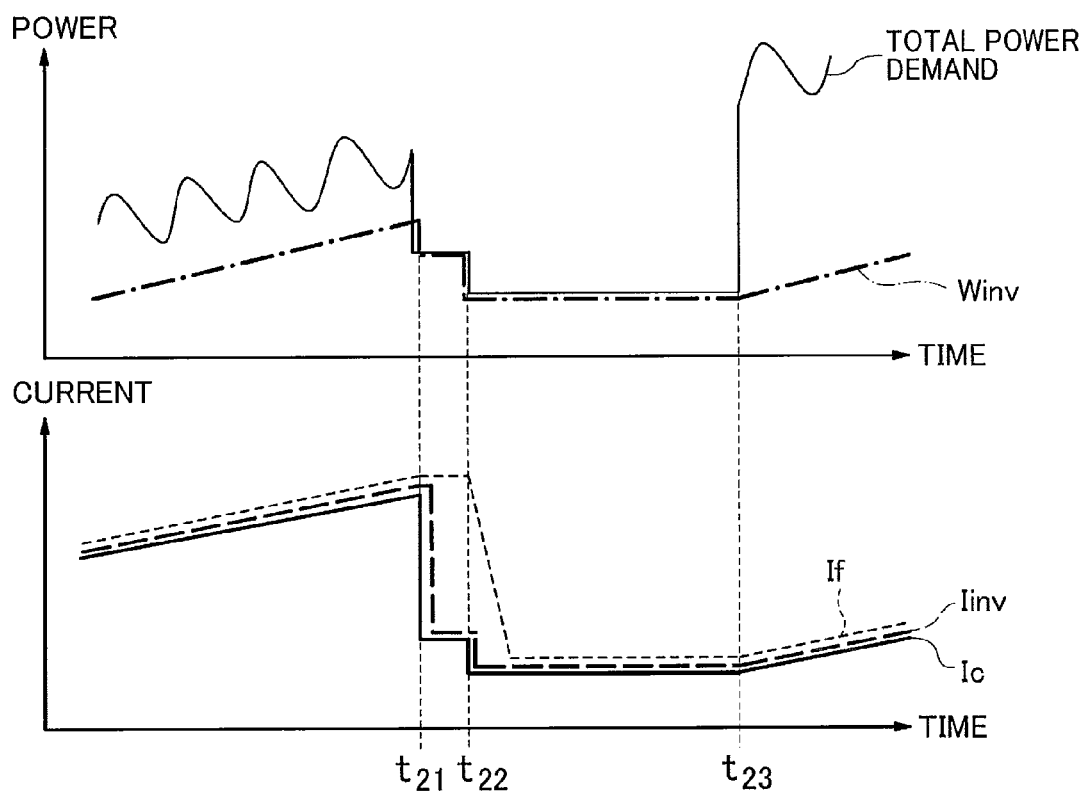
FIG. 14: A timing chart showing the operation of a fuel cell system according to an embodiment of the present invention.

Next, referring to FIGS. 12 through 14, we explain one example of the operation of the solid oxide fuel cell system 1 according to the present embodiment.

FIG. 12 shows a graph of power on the top and current on the bottom.

First, as shown by the thin solid line on the top half of FIG. 12, if the total power demand from facilities such as the residence 200 etc. is gradually increasing as it fluctuates, the extractable current value Iinv will also be gradually increased in response (times t0-t1 in FIG. 12). During this interval, step S23 in the FIG. 11 flowchart is repeated, and the extractable current value Iinv is raised at the first current increase rate of 20 [mA/sec]. If the extractable current value Iinv is input from the control section 110, the inverter control section 111 controls the inverter 54 independently from the control of the control section 110, and the actual extracted current Ic not exceeding the extractable current value Iinv is extracted from the fuel cell module 2 At times t0-t1 in FIG. 12, the total power demand at all times exceeds the extractable current value Iinv. Therefore, the actual extracted current Ic matches the extractable current value Iinv, which is the upper limit value of what can be extracted, and the interconnect power Winv is also raised together with the actual extracted current Ic. In such circumstances, notwithstanding the fact that inverter control section 111 is controlling the inverter 54 independently from the control section 110, the actual extracted current Ic is under the control of the control section 110. Note that the fuel supply current value If is raised slightly ahead of the extractable current value Iinv. The insufficient power resulting from the difference between the total power demand and the interconnect power Winv is made up by the grid power WI.

Next, at time t1 in FIG. 12, if total power demand suddenly decreases, the inverter control section 111 controls the inverter 54 in response to the reduction, causing a decrease in the actual extracted current Ic (interconnect power Winv) extracted from the fuel cell module 2. The control section 110 causes the extractable current value Iinv to be reduced to the same value as the actual extracted current Ic (step S3 in FIG. 10) so that no excessive power extraction occurs due to the previously noted overshoot. At the same time, at time t1, the control section 110 maintains the fuel supply current If at the previous value, not reducing it. This is because suddenly reducing the fuel supply amount (fuel supply current value If) together with the extractable current value Iinv invites a sudden temperature drop, so that not only does the operation of the fuel cell module 2 become unstable, and since there is a high probability that the power demand will increase immediately after a sudden drop in power demand, one would like to be able follow this quickly. But because of the reduction in the temperature of the fuel cell module 2, a long time period is required for recovery, so the fuel supply current value If is not reduced. Therefore, if the extractable current value Iinv is suddenly reduced, the fuel supply current value If is reduced with a further delay. In a state in which the fuel supply current value If is being maintained immediately after the reduction in the extractable current value Iinv, there is a margin in the fuel supply amount to the fuel cell module 2 relative to the extractable current value Iinv.

At time t1-t2 in FIG. 12, the total power demand is still reduced. Therefore, the generating chamber 10 maintains the extractable current value Iinv at a fixed level (step S21 in FIG. 11), and the fuel supply current value If is also maintained at a fixed value, with extra fuel.

Next, when the total power demand again rises at time t2, because the fuel supply current value If is maintained at a fixed level and there is extra margin in the fuel supply amount to the fuel cell module 2, the control section 110 causes the extractable current value Iinv to rapidly rise at the second current increase rate, which is 200 [mA/sec] greater than the normal rate (the first current increase rate) (step S22 in FIG. 11). This results in improving the load following characteristics relative to the total power demand. That is, when the extractable current value Iinv output from the control section 110 is raised, the inverter control section 111 extracts the actual extracted current Ic from the fuel cell module 2 within the range of this increased the extractable current value Iinv. Rapidly raising the extractable current value Iinv enables the extraction of a large power from the fuel cell module 2 suited to the fuel supply current value If, so that the amount of the grid power WI used can be suppressed.

Note that in the present embodiment, the extractable current value Iinv is raised at a current increase rate of 200 [mA/sec], which is the second current increase rate, and at a normal current increase rate of 20 [mA/sec], which is the first current increase rate. If the current increase rate is the first current increase rate only, the extractable current value Iinv rises gradually from time t2, as shown by the double dot and dash line in FIG. 12. Therefore, if the current increase rate is not raised rapidly, then even if the fuel supply amounts are the same, the actual extracted current Ic is reduced by only the amount of the diagonally shaded region in FIG. 12, and fuel is wastefully expended. Conversely, the problem of slow temperature change, which is a major issue for the solid oxide fuel cells resulting from the use of power demand prediction control in this technology, is solved, and the load following characteristics can be rapidly raised.

Note that in this embodiment, the fuel supply current value If is maintained as is. But if there is too great a deviation between the fuel supply current value If and the extractable current value Iinv, the large over-increase in the amount of extra fuel will be wasteful even considering the re-restoration of total power demand, so it can be said that an even more preferable response is to maintain the fuel supply current value while keeping the deviation amount from becoming too large.

At time t3 in FIG. 12, when the difference between the fuel supply current value If and the actual extracted current Ic is reduced, the control section 110 changes the current increase rate to 20 [mA/sec], which is the first current increase rate, making the rise in the extractable current value Iinv gradual (step S23 in FIG. 11). This is to prevent an occurrence of a fuel depletion caused by the operational offset with the inverter control section 111, which controls the inverter 54 independently of the control section 110 when the extractable current value Iinv is suddenly raised in a state in which there is little margin in the fuel supply amount (the fuel supply current value If).

Next, when the extractable current value Iinv has risen and the fuel supply current value If approaches at time t4 in FIG. 12, the fuel supply current value If is also raised together with the extractable current value Iinv, so a certain reserve amount is secured relative to the extractable current value Iinv.

Next, referring to FIG. 13, we explain another example of the operation of the solid oxide fuel cell system 1 according to the present embodiment.

In the operational example shown in FIG. 12, after the total power demand drops at time t1, the total power demand shifts to rising during the period when the fuel supply current value If is being maintained. Relative to this, in the example shown in FIG. 13, the time after the total power demand drops until this shift to rising is lengthy. Since supplied fuel is wasted when the time during which the large fuel supply current value If is maintained, the fuel supply current value If is reduced after a predetermined fuel reduction standby time tw elapses.

After the sharp drop in the total power demand at time t11 in FIG. 13, the total power demand stays low until time t13. In the present embodiment, the control section 110 is constituted so that if the total power demand drops sharply and the extractable current value Iinv is reduced to the actual extracted current Ic, the fuel supply current value If is maintained at a fixed level thereafter during an interval of the 15 sec fuel reduction standby time tw.

In the example shown in FIG. 13, after the sharp drop in the total power demand at time t11, that total power demand stays low even at time t12 when the fuel reduction standby time tw has elapsed. Therefore. the control section 110 reduces the fuel supply current value If (the fuel supply amount) at a predetermined reduction rate starting at time t12. A value is selected for the reduction rate such that the fuel cell module 2 can maintain appropriate operation. Note that in the example shown in FIG. 13, the fuel supply current value If is reduced after the elapse of the fuel reduction standby time tw, but if the difference between the extractable current value Iinv and the fuel supply current value If is less than a certain amount, the fuel supply current value If is maintained without being reduced, notwithstanding the elapse of the fuel reduction standby time tw. Thus, minute fluctuations in the fuel supply current value If can be prevented from adversely affecting the operation of the fuel cell module 2.

Next, when the total power demand rises at time t13 in FIG. 13, the control section 110 causes the extractable current value Iinv and the fuel supply current value If to rise. However, the rise of the extractable current value Iinv at this point does not occur immediately after the sharp reduction in the extractable current value Iinv; the fuel supply current value If is also reduced, so the rate of the extractable current value Iinv current rise is set at the normal value, which is the first current increase rate of 20 [mA/sec]. That is, at time t13 in FIG. 13, the conditions of step S20 in FIG. 11 are not met, and step S23 is executed.

Note that the present embodiment is constituted so that after reducing the fuel supply current value If for 15 seconds, maintenance of the excess fuel level is stopped, but it can be said that in cases where the total power demand declines even further, the probability that the total power demand will recover and rise is low. Therefore, rapidly reducing the fuel supply current value If without waiting the 15 seconds to maintain fuel supply current value If is even more preferable.

Next, referring to FIG. 14, we explain another example of the operation of the solid oxide fuel cell system 1 according to the present embodiment.

In the operational example shown in FIG. 14, after a sharp drop of the total power demand, the total power demand again has sharply dropped, without rising. In such cases, the possibility that the total power demand will quickly shift to rising is assumed to be low, even if the fuel reduction standby time tw has elapsed after the first sharp drop. Therefore, the control section 110 reduces the fuel supply current value If.

In the example shown in FIG. 14, after a sharp drop in the total power demand at time t21, at time t22 before the elapse of a 15 sec fuel reduction standby time tw, the total power demand again drops sharply. Thus, if the difference between the fuel supply current value If and the extractable current value Iinv expands, the control section 110 reduces the fuel supply current value If (the fuel supply amount) at a predetermined reduction rate starting at time t22, even if the fuel reduction standby time tw has not yet elapsed since the first sharp reduction in total power demand. Next, when total power demand rises at time t23 in FIG. 14, the extractable current value Iinv and the fuel supply current value If are increased.

In the solid oxide fuel cell system 1 of the embodiment according to the present invention, the control section 110 controls the fuel flow regulator unit 38 (FIGS. 12-14) so that the fuel supply current value If (the fuel supply amount) is reduced more than the reduction of the extractable current value Iinv, even when the extractable current value Iinv is suddenly reduced, thereby avoiding sudden temperature drops, etc. in fuel cell module 2. Since the fuel supply amount is reduced after a delay following a sudden reduction of the extractable current value Iinv, a state arises in which there is an extra margin in the fuel supply amount relative to the extractable current value Iinv (time t1-t2 in FIG. 12). In such cases, the controller increases the extractable current value Iinv at a second current increase rate which is larger than the first current increase rate (times t2-t3 in FIG. 12) Therefore, fuel wastage can be suppressed and generating efficiency improved.

Thus, using the solid oxide fuel cell system 1, problems such as a fuel depletion can be reliably avoided, improving the generating efficiency while stably operating the fuel cell module 2.

In the solid oxide fuel cell system 1 of the embodiment according to the present invention, if a difference greater than a predetermined amount is present over the fuel decrease wait time (15 [sec]) (time t12 in FIG. 13) after the the extractable current value decreases (time t11 in FIG. 13), or if the difference between the current corresponding to the fuel supply amount (fuel supply current value If) and the extractable current value Iinv increases (time 22 in FIG. 14), the fuel supply amount is decreased. Therefore, the stable operation of the fuel cell assembly 12 can be balanced with improving the generating efficiency. That is, sudden temperature drops in the fuel cell module 2 and the like can be avoided by reducing the fuel supply amount with a delay after the extractable current value Iinv has fallen. But if a time during which the fuel supply amount is not reduced continues after a reduction of the extractable current value Iinv, fuel can easily be wasted. So the amount of fuel supplied is reduced after the elapse of a fuel reduction waiting time or the like.

In the solid oxide fuel cell system 1 of the embodiment according to the present invention, if the difference between the actual extracted current value Ic and the extractable current value Iinv is equal to or less than a predetermined amount (step S1 in FIG. 10), the extractable current value Iinv is not reduced down to the actual extracted current value Ic. Therefore, if an immediate recovery occurs after a significant drop of the power demand, the extractable current value Iinv is maintained at a level higher than the actual extracted current value Ic. So the inverter 54 is able to freely follow the recovery of the total power demand within that range, and the load following can be improved without concern for overshooting or the like. Furthermore, in cases where the difference between the actual extracted current value Ic and the extractable current value Iinv exceeds the predetermined amount of 1000 [mA], the extractable current value Iinv is reduced down to the actual extracted current value Ic (step S3 in FIG. 10). Therefore, wasting of fuel can be suppressed while stably operating the fuel cell module 2.

In the solid oxide fuel cell system 1 of the embodiment according to the present invention, the extractable current value Iinv is reduced down to the minimum necessary value, or the actual extracted current value Ic, (step S3 in FIG. 10; time t1 in FIG. 12; time t11 in FIG. 13; and time t21 in FIG. 14) while a reduction of the fuel supply amount is delayed. Therefore, wasting of fuel can be fully suppressed while assuring secure operation of fuel cell module 2.

In the solid oxide fuel cell system 1 of the embodiment according to the present invention, in cases where the fuel supply amount is maintained at a fixed level after the extractable current value Iinv is suddenly decreased in order to follow the drop of the actual extracted current value Ic (times t1-t2 in FIG. 12), the extractable current value Iinv is increased (time t2-t3 in FIG. 12) at a large current increase rate when the power demand begins to rise. Therefore, the extractable current value Iinv can be quickly increased in a state in which there is a reliable margin for the fuel supply amount, and the following characteristics relative to changes of the power demand can be improved while securing the stable operation of the fuel cell module 2.

The invention claimed is:

1. A solid oxide fuel cell system for generating electrical power variable in response to power demand, comprising:
    a fuel cell module configured to generate electricity by reaction of fuel;
    a fuel supply device configured to supply the fuel to the fuel cell module;
    a power demand detection device configured to detect the power demand;
    an inverter operable to extract electrical current from the fuel cell module and output the extracted current in alternating form;
    a controller programmed to
        (i) from the power demand detected by the power demand detection device, generate a target current signal, indicative of a target amount of fuel to be supplied to the fuel cell module, which directs the fuel supply device to supply the target amount of fuel to the fuel cell module so that the fuel cell module generates electricity sufficient to follow transitions of the power demand, and
        (ii) from the power demand detected by the power demand detection device, generate an extractable current signal, indicative of a maximum current value extractable from the fuel cell module, which directs inverter to extract electrical current from the fuel cell module to an extent not to exceed the maximum extractable current value;
    an extracted current detection device configured to generate an actual current signal indicative of a value of current extracted from the fuel cell module by the inverter,
    wherein the controller is further programmed to vary the extractable current signal to increase the maximum extractable current value at different increase rates in such a manner that the maximum extractable current value is increased at a higher increase rate when a degree to which the target current signal is higher than the actual current signal is greater so as to allow the inverter to extract more current from the fuel cell module when the degree to which the target current signal is higher than the actual current signal is greater.

2. The solid oxide fuel cell system according to claim 1, wherein the controller is programmed to change the target current signal to decrease the amount of fuel to be supplied to the fuel cell module when either of the following conditions (a)+(b) or (a)+(c) is met:
   (a) the degree to which the target current signal is higher than the actual current signal is greater than a predetermined degree;
   (b) condition (a) stays for a predetermined period of time; and
   (c) while condition (a) is met, the degree to which the target current signal is higher than the actual current signal increases within the predetermined period of time.

3. The solid oxide fuel cell system according to claim 2, wherein the controller is programmed to change the extractable current signal to decrease the maximum extractable current value so that the inverter is allowed to extract less current from the fuel cell module when the extractable current signal is higher than the actual current signal by a predetermined threshold or more.

4. The solid oxide fuel cell system according to claim 3, wherein the controller is programmed to decrease the maximum extractable current value to the value of current being extracted from the fuel cell module by the inverter.

5. The solid oxide fuel cell system according to claim 2, wherein the controller is programmed to change the extractable current signal to increase the maximum extractable current value so that the inverter is allowed to extract more current from the fuel cell module when the following conditions (d)+(e) are met:
   (d) the degree to which the target current signal is higher than the actual current signal is greater than the predetermined degree; and
   (e) while condition (d) is met, the power demand detected by the power demand detection device starts to increase within the predetermined period of time.

* * * * *